United States Patent
Zimmerman, III et al.

(10) Patent No.: US 11,191,145 B2
(45) Date of Patent: Nov. 30, 2021

(54) AERIALLY MOUNTED WIRELESS NETWORKING DEVICE ANTENNA SYSTEM

(71) Applicant: UBICQUIA LLC, Fort Lauderdale, FL (US)

(72) Inventors: Ronald B. Zimmerman, III, Fort Lauderdale, FL (US); Ian B. Aaron, Fort Lauderdale, FL (US)

(73) Assignee: Ubicquia, Inc., Fort Lauderdale, FL (US)

( * ) Notice: Subject to any disclaimer, the term of this patent is extended or adjusted under 35 U.S.C. 154(b) by 0 days.

(21) Appl. No.: 16/960,513

(22) PCT Filed: Jan. 8, 2019

(86) PCT No.: PCT/US2019/012784
§ 371 (c)(1),
(2) Date: Jul. 7, 2020

(87) PCT Pub. No.: WO2019/136486
PCT Pub. Date: Jul. 11, 2019

(65) Prior Publication Data
US 2020/0359462 A1 Nov. 12, 2020

Related U.S. Application Data

(60) Provisional application No. 62/730,486, filed on Sep. 12, 2018, provisional application No. 62/614,918, filed on Jan. 8, 2018.

(51) Int. Cl.
H04W 88/10 (2009.01)
H04W 24/08 (2009.01)
(Continued)

(52) U.S. Cl.
CPC ............. *H05B 47/11* (2020.01); *H01Q 1/246* (2013.01); *H01Q 21/28* (2013.01); *H04W 24/08* (2013.01);
(Continued)

(58) Field of Classification Search
CPC ....... H01Q 1/246; H01Q 21/28; H04W 24/08; H04W 88/10; H05B 47/10; H05B 47/11; H05B 47/19; Y02B 20/40
(Continued)

(56) References Cited

U.S. PATENT DOCUMENTS

2014/0243043 A1\* 8/2014 Shen ...................... H01Q 1/125
455/553.1
2015/0349399 A1\* 12/2015 Lasier .................... H05B 47/19
343/721
(Continued)

OTHER PUBLICATIONS

PCT/US2019/012784—International Search Report and Written Opinion, dated Apr. 16, 2019, 12 pages.

*Primary Examiner* — Tan H Trinh
(74) *Attorney, Agent, or Firm* — Daniel C. Crilly; Thomas J. Satagaj

(57) ABSTRACT

A small cell networking device includes a light sensor and a light control circuit. The device also includes a compartment in which at least one printed circuit board (PCB) is mounted. A first networking module, a second networking module, and a third networking module are mounted on the PCB. The first networking module is a gateway to a first cellular-based network. The second networking module is a gateway to a second cellular-based network. The third networking module monitors network traffic. First and second antennas are mounted to a first surface of the compartment, between a second surface of the compartment and the PCB. A third antenna is mounted to the second surface of the compartment between the second surface of the compart- (Continued)

ment and the PCB. The first, second, and third antennas are respectively coupled to the first, second, and third networking modules.

20 Claims, 18 Drawing Sheets

(51) Int. Cl.
*H05B 47/11* (2020.01)
*H05B 47/19* (2020.01)
*H01Q 1/24* (2006.01)
*H01Q 21/28* (2006.01)
*H05B 47/10* (2020.01)

(52) U.S. Cl.
CPC ............ *H04W 88/10* (2013.01); *H05B 47/19* (2020.01); *H05B 47/10* (2020.01)

(58) Field of Classification Search
USPC .............................. 455/41.2, 553.1; 343/721
See application file for complete search history.

(56) References Cited

U.S. PATENT DOCUMENTS

| | | | |
|---|---|---|---|
| 2015/0365829 A1 | 12/2015 | Grayson et al. | |
| 2017/0279187 A1* | 9/2017 | Lockwood | H01Q 1/246 |
| 2019/0341732 A1* | 11/2019 | Aaron | F21V 23/06 |
| 2020/0375016 A1* | 11/2020 | Hutson | H04W 4/90 |
| 2020/0383173 A1* | 12/2020 | Aaron | F21S 8/086 |

* cited by examiner

AERIALLY MOUNTED WIRELESS NETWORKING DEVICE ANTENNA SYSTEM

BACKGROUND

Technical Field

The present disclosure generally relates to devices having both cellular network capabilities and light control capabilities integrated therein. More particularly, but not exclusively, the present disclosure relates to a small cell networking device antenna system that is mountable on a light pole.

Description of the Related Art

A mobile network operator (MNO) is an entity that operates a cellular communications system. Mobile network operators may be private entities, public entities such as would be owned and controlled by a government, public-private partnership entities, or other entities. A mobile network operator may be a for-profit entity, a non-profit entity, or an entity having some other financial model.

As the term is used in the present disclosure, an MNO may also be referred to as a wireless carrier, a cell service provider, a wireless service provider, cellular company, and many other like terms. An MNO provides cellular-based wireless communication services.

An MNO is different from a provider of other wireless services because the MNO owns or otherwise controls certain specific elements that are necessary to deliver wireless communication services to an end user. These necessary specific elements that set apart an MNO from providers of other wireless service include radio spectrum allocation (i.e., one or more radio spectrum licenses from a regulatory or government entity), wireless network infrastructure, and back haul infrastructure. These infrastructure elements enable the MNO to provide wireless voice, data, or voice and data services to subscribers using frequencies that are allocated as part of the licensed radio spectrum. In addition, though not required, an MNO will generally also have an available infrastructure to charge and collect money for use of its wireless services, a customer service infrastructure, repair personnel and facilities, and the ability to provision computing devices (e.g., cell phones, smart phones, tablets, global positioning service (GPS) devices, vehicle-based devices, and the like) for permissive use of its wireless network services.

In some cases, MNOs or other entities provide non-cellular wireless services such as "WiFi" services. WiFi services are known to pass communications according to a communications standard administered by the Institute of Electrical and Electronic Engineers (IEEE). One such standard is referred to as IEEE 802.11. These non-cellular wireless communication services may be available to the public free or for a cost. These non-cellular wireless communication services may be available in restaurants, airports, airplanes, public buildings, and the like. Even when these WiFi services are provided by an MNO, these WiFi services are not considered "MNO services" or "cellular-based" services because they are delivered to end user devices using non-cellular frequencies and protocols. What's more, even if some portion of WiFi-delivered data is passed over a cellular-based network (e.g., infrastructure downstream of a WiFi access point couples communications to or through a cellular-based network), these services are still not considered MNO services, cellular-based services, or carrier services because the interface to the end-user device is enabled via WiFi services and not by cellular-based services.

In some cases, an MNO operates and offers access to its own branded cellular-based infrastructure. In other cases, an MNO provides access to its cellular-based infrastructure to other entities that provide services under a different brand. These other entities may be known as "downstream" or "virtual" carriers or by other such titles and phrases. The term MNO in the present disclosure includes actual mobile network operators, virtual network operators, and other such entities when the underlying wireless services are provided to an end user via the necessary specific elements that set apart an MNO from other providers of wireless service.

For reference but not completeness, some known MNOs of the Americas include AT&T, BELL, CLARO, ENTEL, MOVILNET, MOVISTAR, ROGERS, SPRINT, T-MOBILE, TELCEL, TELUS, TIM, VERIZON, and VIVO. Some European MNOs include EE, MEGAFON, MTS, O2, ORANGE, and VODAFONE. Some Asia-Pacific MNOs include AIRTEL, AIS, BSNL, CHINA MOBILE, CHINA TELECOM, CHINA UNICOM, DEA CELLULAR, JIO, KT, NTT DOCOMO, SK TELECOM, SOFTBANK CORP, TELSTRA, and VODAFONE.

In a cellular-based network, wireless communications to and from a user's mobile device occur at various frequencies and according to a protocol controlled by the MNO. The user's mobile device includes a wireless transceiver arranged to communicate according to the MNO controlled frequency and protocol. During communications, the user's wireless transceiver is communicatively coupled to a wireless transceiver commissioned by the MNO. The data sent and received between the two wireless transceivers may include voice communications, short message service (SMS) messages, electronic mail, internet traffic, and any other such data.

The large area over which an MNO's cellular-based network operates is divided into areas called macrocells, which may be abbreviated simply to "cells." Many adjacent macrocells are formed to provide wireless cellular-based network coverage over a wide geographic area. Each macrocell may be served by one or more MNO commissioned transceivers. Typically, however, each macrocell is served by three macrocell sites, which may also be referred to as base stations, base transceivers, cell towers, cell stations, or the like. Neighboring macrocells are generally arranged to use different frequencies, phases, or other distributive characteristics of the MNOs licensed frequency spectrum to reduce or avoid interference between macrocells. The macrocells and the mobile computing devices provisioned by the MNO to operate on its network are arranged to cooperate communicatively such that a mobile device may continue seamless communications as the mobile device moves from one macrocell to another.

FIG. 1 is a representation of a geographic area served by an MNO's cellular-based network 10. The geographic area is divided into a plurality of adjacent macrocells, which in FIG. 1 are represented as having a generally hexagonal shape. For simplicity, a single MNOs cellular-based wireless network is represented in FIG. 1. It is recognized, however, that two or more cellular-based wireless networks frequently overlap and cover the same geographic area. This overlap increases consumer choices and options as multiple MNOs can operate competing wireless cellular-based networks.

The hexagonal shaped cells shown in FIG. 1 are in many cases preferred, but it is understood that the actual shapes and pattern can depend on terrain, transmission and reception characteristics, access to desirable cell tower locations, population density, and the like. In other cases, a macrocell has a square shape, a circular shape, a different regular shape, or an irregular shape.

A representation of a macrocell tower 12 is also illustrated in FIG. 1. The macrocell tower 12 includes a tower mast 14, a transceiver structure bearing a first cellular antenna 16a, a second cellular antenna 16b, and a third cellular antenna 16c. The three cellular antennas 16a-16c are directional antennas, and each of the cellular antennas is arranged to cover a 120 degree field. Each of the cellular antennas 16a-16c is tuned and arranged to pass wireless communication signals according to the chosen parameters of the MNOs licensed radio spectrum.

The macrocell tower 12 of FIG. 1 may include an optional fourth antenna 18. The fourth antenna 18 may be a microwave antenna or some other type of antenna. The fourth antenna 18 may provide line of sight communications to another macrocell tower (not shown) or to another site.

Power and land-based communication services are provided to the macrocell tower 12 by a cable assembly 20. In typical cellular-based network communications, the cable assembly 20 includes fiber optic cable to pass data sent to or from a mobile device from or into the public switched telephone network (PSTN), which is not shown. A core switched network device (not shown) may be used to pass voice and text data; a packet switched network device (not shown) may be used to pass electronic mail, internet, and other packetized data.

FIG. 2 shows an enlarged view of a plurality of adjacent macrocell sites 22a-22h in the geographic area served by an MNOs cellular-based network 10. In this geographic area, each macrocell 22a is served by three macrocell towers 12 (FIG. 1) wherein each macrocell tower is arranged at a cell intersection point 24. Several cell intersection points 24 are shown in FIG. 2, but not every cell intersection point in the geographic area of FIG. 2 is marked. From the cell intersection points 24 that are marked, however, it is evident that each of the three antennas of a macrocell tower 12 is directed into a different macrocell, and each macrocell is served by three different macrocell towers 12.

Macrocell 22h of FIG. 2 is also illustrated as having geometric markings. The parameters of the formuae illustrated in FIG. 2 may be used by the MNO to determine how large a cell is, where macrocell towers are placed, where frequencies are re-used, and how much power is output from each macrocell tower. These and other parameters associated with providing wireless cellular-based communication services are determined and arranged by the MNO. In many cases, for example, a macrocell 22a-22h may have a diameter of about one mile to about 25 miles. In many cases, radiated broadcast power from each antenna 16a-16c of a macrocell tower 12 is up to about 500 watts. Typically, an MNO will arrange broadcast power and frequency spectrum use individually for each antenna to meet the conditions desired or otherwise chosen by the MNO, and often, these parameters are selected to permit line of sight communications from one macrocell tower 12 to six or more other macrocell towers 12.

In the enlarged view of FIG. 2, one macrocell 22d is illustrated as having several smaller hexagons arranged therein. The smaller geographic areas covered by the smaller sites represent areas that are challenged by geographic features, population density, or other factors where an MNO decides additional cellular coverage is necessary. Other arrangements of shapes and sizes are of course formed and implemented by conventional MNOs.

In the smaller areas shown in macrocell 22d, which may exist in any macrocell 22a-22h, an MNO may determine that additional network coverage is necessary, but the smaller area is not desirably serviceable by a macrocell tower 12. In these cases, the MNO may deploy a "small cell" to provide wireless cellular-based network communication services. It is generally known that a "small cell" is a term of art in the cellular-based industry. A mobile device provisioned by the MNO communicates with a small cell in the same or similar manner that the mobile device communicates with a macrocell tower 12. In at least some cases, an active communication session formed between a small cell and a mobile device may be handed off to or from a small cell as the mobile device moves into or out from the active range of the small cell. For example, a user having an active communication session enabled by a small cell may be in motion, and when the mobile device is in motion, the active communication session may in some cases be automatically and seamlessly handed off and continue via another small cell or via a macrocell tower 12.

As is known, many different types of small cells are deployed by MNOs to serve particular geographic areas within a larger macrocell. Some of the different types are microcells, metrocells, picocells, and femtocells. Microcells generally cover an area having diameter less than about one mile and operate with a radiated power of about five watts (5 W) to ten watts (10 W). Metrocells generally cover an area having a diameter of less than about a half mile and operate with a radiated power of about 5 W or less. Metrocells can provide wireless cellular-based service for up to about 200 concurrent mobile devices. Picocells generally cover an area having a diameter less than about 500 feet and operate with a radiated power of about 100 milliwatts (mW) to 5 W; providing cellular-based wireless service for up to about 5 dozen concurrent mobile devices. Femtocells generally cover areas having a diameter less than about 30 feet and operate with a radiated power of about 10 mW to 1000 mW to provide cellular-based service for up to just a few mobile devices.

Small cells are usually owned, installed, and maintained by the MNO on whose network they will operate. Even in cases of femtocells, which may be installed by a non-MNO entity, the femtocells are deployed and provisioned by the MNO for operation on the MNO's wireless cellular-based network. This provisioning is necessary in a small cell because the small cell operates in the MNO's licensed frequency spectrum. In addition to having a front end with a cellular-based interface, the small cell has a back end that provides backhaul services for the device. Small cell backhaul is the transmission link between the small cell and the MNO's core network. In some small cells, backhaul services are provided across conventional broadband internet services such as digital subscriber line (DSL), cable, a T1 line, or some other wide area network access point.

Small cells may include multiple antennas that transmit signals to and receive signals from user devices, for example. If a small cell has a small physical footprint, the antennas of the small cell are located relatively close to one another. Radio frequency (RF) (i.e., approximately 20 kHz to 300 GHz) co-site interference may occur when two or more co-located RF systems have a negative impact on each other. For example, operation of a transmitter of the small cell may negatively impact reception by one or more receivers of the small cell. The degree to which such a transmitter negatively impacts the reception by the receivers depends on a number of factors, including the distance between transmitting and receiving antennas, the radiation pattern of the transmitting antenna, the gain patterns of the receiving antennas, the magnitude of the power level of transmitted signals, and the frequencies of transmitted and received signals, for example.

Conventional streetlight systems are known to those of ordinary skill in the street-lighting arts. Conventional street lights are typically mounted above a roadway, parking lot, or the like on a street light pole, lamppost, or some other elevated structure. Historically, street lighting was provided by incandescent filament-based lighting sources. In modern times, high-intensity discharge lighting sources such as high pressure sodium lamps are used to light streets and other areas. Even more recently, light emitting diode (LED) based luminaires are deployed to provide bright, controllable lighting with lower power consumption. In order to safely and effectively fulfill the needs of municipalities, governments, and private entities in an cost-efficient manner, most streetlight systems and sub-systems conform to one or more standards promulgated by a standards body.

The American National Standards Institute (ANSI) is a standards body that publishes and promotes standards for certain electrical equipment, mechanical equipment, and electromechanical equipment in use today. ANSI is a private, non-profit organization that oversees and administers development of voluntary consensus standards for products, services, processes, systems, protocols, and the like. It is also known that ANSI coordinates at least some U.S. standards with at least some international standards, which permits products manufactured according to U.S. standards to be used in other non-U.S. countries in the world.

Various standards developed by organizations, government agencies, consumer groups, companies, and others are accredited by ANSI. These standards are developed and promoted to provide consistent characteristics, definitions, terms, testing, implementation, and performance in products that are compliant with a given standard.

The National Electrical Manufacturers Association (NEMA) is one such organization that develops, promotes, or otherwise partners with ANSI. According to publicly available information, the NEMA is the largest trade association of electrical equipment manufacturers in the United States. NEMA is a consortium of several hundred member companies that manufacture products used in the generation, transmission, distribution, control, and end use of electricity. These products are used in utility, industrial, commercial, institutional, and residential applications including lighting products installed over roadways, parking lots, constructions sites, pedestrian malls, manufacturing floors, and the like.

NEMA publishes standards documents, application guides, white papers, and other technical papers. NEMA also publishes and promotes several hundred technical standards for electrical enclosures, controllers, communication protocols, motors, wire, plugs, and receptacles among other equipment. Certain ones of NEMA's American National Standards directed toward Roadway and Area Lighting Equipment are referred to as ANSI C136 standards. At least one NEMA standard, referred to as ANSI C136.41, is directed to external locking type photo-control devices for street and area lighting.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

A "small cell" is a term of art in the cellular-based (i.e., mobile) industry. A small cell is deployed to provide wireless cellular-based network communication services in an area that is not adequately served by a macrocell tower. Certain approved mobile devices communicate with and through a small cell in the same or similar manner that the mobile devices communicate with a macrocell tower.

Until now, small cells were made or contracted to be made by and for individual mobile network operators (MNOs). Because each small cell must be integrated and adapted to work with proprietary features of a MNO's networks, the MNO controls each small cell that operates on its cellular-based network. The methods, devices, and systems described herein are directed to small cells of a particular electromechanical configuration, which are arranged to be mounted on a streetlight fixture. These small cells add cooperative functionality and capabilities to the roadway and area lighting arts that have not previously been seen or known before.

In a first embodiment, a small cell networking device may be summarized as including: a light sensor; a processor-based light control circuit arranged to provide a light control signal based on at least one ambient light signal generated by the light sensor; a compartment defined by a first surface and a second surface that extends from the first surface along the periphery of the first surface; at least one printed circuit board mounted in the compartment; a first networking module mounted on the at least one printed circuit board, the first networking module being arranged as a gateway to a first cellular-based network, the first cellular-based network controlled by a first mobile network operator (MNO); a second networking module mounted on the at least one printed circuit board, the second networking module being arranged as a gateway to a second cellular-based network, the second cellular-based network controlled by a second MNO; a third networking module mounted on the at least one printed circuit board, the third networking module being arranged to monitor traffic in the first cellular-based network or the second cellular-based network; a first antenna mounted to the first surface between the second surface and the at least one printed circuit board, the first antenna being communicatively coupled to the first wireless transceiver module; a second antenna mounted to the first surface between the second surface and the at least one printed circuit board, the second antenna being communicatively coupled to the second wireless transceiver module; and a third antenna mounted to the second surface between the second surface and the at least one printed circuit board, the third antenna being communicatively coupled to the third networking module.

The first antenna may be disposed at a first side of the compartment, the second antenna may be disposed at a second side of the compartment, and the first side of the compartment may be opposite the second side of the compartment.

The first surface may be a planar surface having a rectangular shape.

The small cell networking device of claim may include a connector compliant with a roadway area lighting standard promoted by a standards body. The connector may be compliant with American National Standards Institute (ANSI) C136.

The small cell networking device may include a location module mounted on the at least one printed circuit board, the location module being arranged to provide data suitable to determine a location of the small cell networking device.

In a second embodiment, a small cell networking device may be summarized as including: a light sensor; a processor-based light control circuit arranged to provide a light control signal based on at least one ambient light signal generated by the light sensor; a compartment defined by a first surface and a second surface that extends from the first surface along the periphery of the first surface; at least one printed circuit board mounted in the compartment; a first wireless transceiver module mounted on the at least one printed circuit board, the first wireless transceiver module being arranged to transmit and receive data according to a first data communication standard; a second wireless transceiver module mounted on the at least one printed circuit board, the second wireless transceiver module being arranged to transmit and receive data according to a second data communication standard, the second data communication standard being different from the first data communication standard; a location module mounted on the at least one printed circuit board, the location module being arranged to provide data suitable to determine a location of the small cell networking device; a first networking module mounted on the at least one printed circuit board, the first networking module being arranged as a gateway to a first cellular-based network, the first cellular-based network controlled by a first mobile network operator (MNO); a first antenna mounted to the first surface between the second surface and the at least one printed circuit board, the first antenna being communicatively coupled to the first wireless transceiver module; a second antenna mounted to the first surface between the second surface and the at least one printed circuit board, the second antenna being communicatively coupled to the second wireless transceiver module; a third antenna mounted to the first surface between the second surface and the at least one printed circuit board, the third antenna being communicatively coupled to the location module; and a fourth antenna mounted to the first surface between the second surface and the at least one printed circuit board, the fourth antenna being communicatively coupled to the first networking module.

The small cell networking device may include a second networking module mounted on the at least one printed circuit board, the second networking module being arranged as a gateway to a second cellular-based network, the second cellular-based network controlled by a second mobile network operator (MNO); and a fifth antenna mounted to the first surface between the second surface and the at least one printed circuit board, the fifth antenna being communicatively coupled to the second networking module.

The fourth antenna may be disposed at a first side of the compartment, the fifth antenna may be disposed at a second side of the compartment, and the first side of the compartment may be opposite the second side of the compartment.

The small cell networking device may include a first shield structure mounted on the at least one printed circuit board, the first shield structure being at least partially disposed between the fourth antenna and the fifth antenna.

The small cell networking device may include a second shield structure mounted on the at least one printed circuit board, a plurality of apertures being formed through the second shield structure.

The small cell networking device may include a third networking module mounted on the at least one printed circuit board, the third networking module being arranged to at least receive signals transmitted on the first cellular-based network or the second cellular-based network; and a sixth antenna mounted to the first surface between the second surface and the at least one printed circuit board, the sixth antenna being communicatively coupled to the third networking module.

The first surface may be a planar surface having a circular shape, and the second surface may provide a wall of a substantially cylindrical body.

The small cell networking device may include a connector compliant with a roadway area lighting standard promoted by a standards body. The connector may be compliant with American National Standards Institute (ANSI) C136. The connector may be compliant with ANSI C136.41-2013.

In a third embodiment, a small cell networking device may be summarized as including: a light sensor; a processor-based light control circuit arranged to provide a light control signal based on at least one ambient light signal generated by the light sensor; a compartment defined by a first surface and a second surface that extends from the first surface along the periphery of the first surface; at least one printed circuit board mounted in the compartment; a first networking module mounted on the at least one printed circuit board, the first networking module being arranged as a gateway to a first cellular-based network, the first cellular-based network controlled by a first mobile network operator (MNO); a second networking module mounted on the at least one printed circuit board, the second networking module being arranged as a gateway to a second cellular-based network, the second cellular-based network controlled by a second mobile network operator (MNO); a first wireless transceiver module mounted on the at least one printed circuit board, the first wireless transceiver module being arranged to transmit and receive data according to a first data communication standard; a second wireless transceiver module mounted on the at least one printed circuit board, the second wireless transceiver module being arranged to transmit and receive data according to a second data communication standard, the second data communication standard being different from the first data communication standard; a first antenna mounted to the first surface between the second surface and the at least one printed circuit board, the first antenna being communicatively coupled to the first networking module; a second antenna mounted to the first surface between the second surface and the at least one printed circuit board, the second antenna being communicatively coupled to the second networking module; a third antenna mounted to the first surface between the second surface and the at least one printed circuit board, the third antenna being communicatively coupled to the first wireless transceiver module; and a fourth antenna mounted to the first surface between the second surface and the at least one printed circuit board, the fourth antenna being communicatively coupled to the second wireless transceiver module.

The first antenna may be disposed at a first side of the compartment, the second antenna may be disposed at a second side of the compartment, and the first side of the compartment may be opposite the second side of the compartment.

The small cell networking device may include a first shield structure mounted on the at least one printed circuit board, the first shield structure being at least partially disposed between the first antenna and the second antenna.

The small cell networking device may include a second shield plate mounted on the at least one printed circuit board, a plurality of apertures being formed through the second shield plate.

The first surface may be a planar surface having a circular shape, and the second surface may provide a wall of a substantially cylindrical body.

The small cell networking device may include a third networking module mounted on the at least one printed circuit board, the third networking module being arranged to at least receive signals transmitted on the first cellular-based network or the second cellular-based network; and a fifth antenna mounted to the first surface between the second surface and the at least one printed circuit board, the fifth antenna being communicatively coupled to the third networking module.

The small cell networking device may include a location module mounted on the at least one printed circuit board, the location module being arranged to provide data suitable to determine a location of the small cell networking device; and a sixth antenna mounted to the first surface between the second surface and the at least one printed circuit board, the sixth antenna being communicatively coupled to the location module.

The small cell networking device may include a connector compliant with a roadway area lighting standard promoted by a standards body. The connector may be compliant with American National Standards Institute (ANSI) C136. The connector may be compliant with ANSI C136.41-2013.

These features, along with other objects and advantages that will become subsequently apparent, reside in the details of construction and operation more fully described hereafter and claimed, reference being made to the accompanying drawings that form a part hereof.

This Brief Summary has been provided to introduce certain concepts in a simplified form that are further described in detail below in the Detailed Description. Except where otherwise expressly stated, the Brief Summary does not identify key or essential features of the claimed subject matter, nor is it intended to limit the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
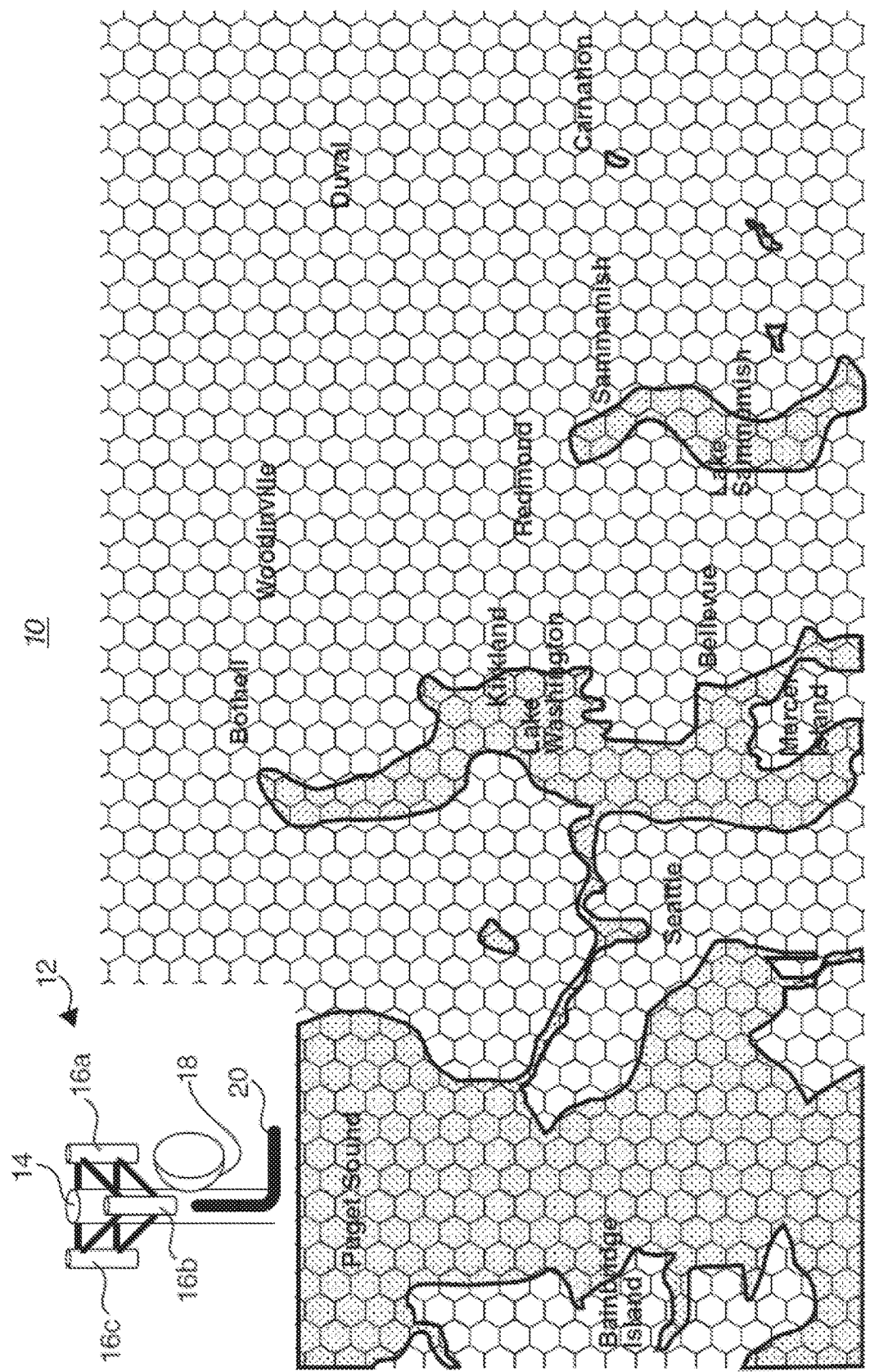
FIG. 1 is a representation of a geographic area served by a mobile network operator's (MNO's) cellular based network.
Figure 2:
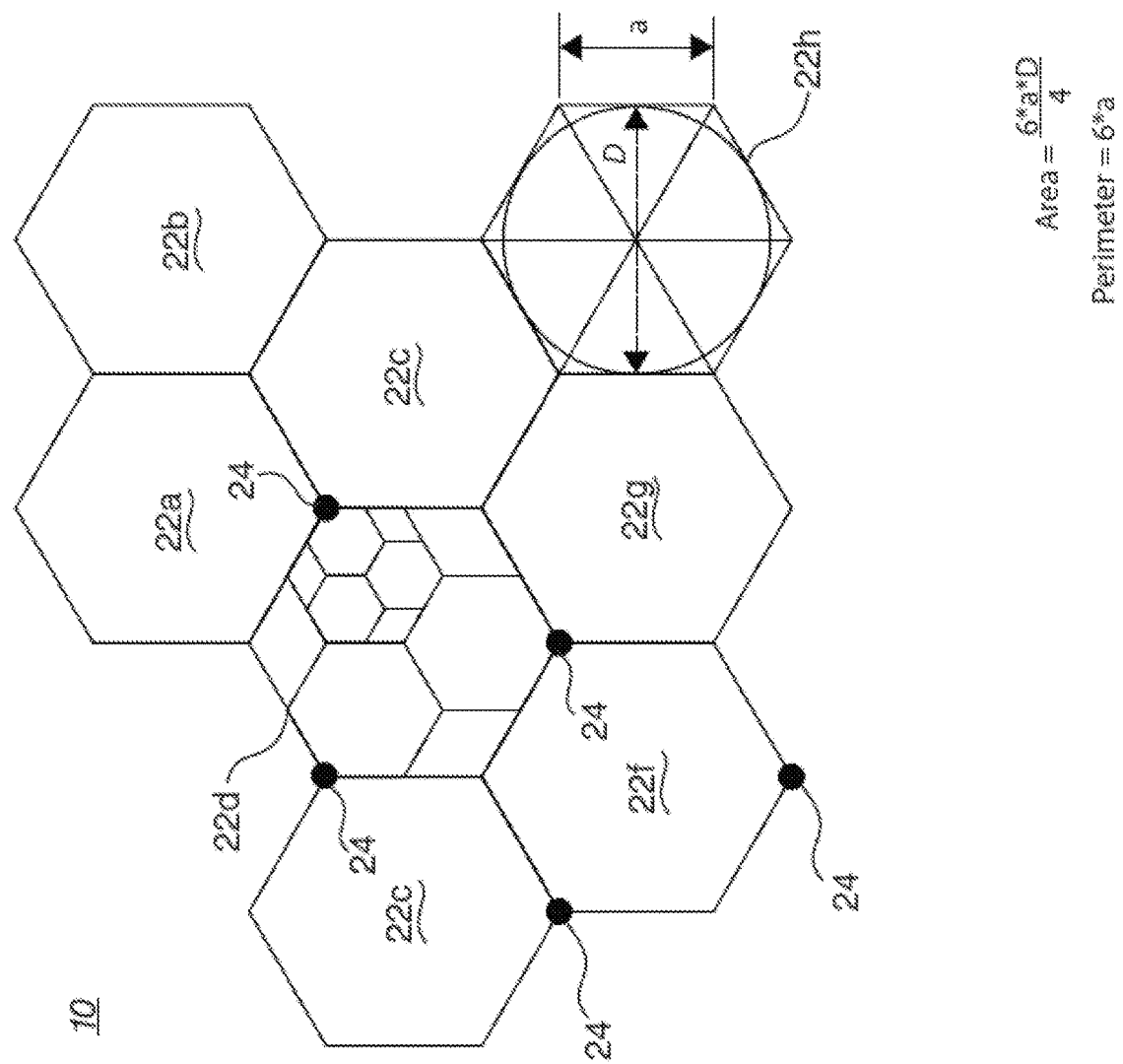
FIG. 2 shows an enlarged view of a plurality of adjacent macrocell sites in the geographic area served by an MNO's cellular-based network.

The present invention may be understood more readily by reference to this detailed description of the invention. The terminology used herein is for the purpose of describing specific embodiments only and is not limiting to the claims unless a court or accepted body of competent jurisdiction determines that such terminology is limiting. Unless specifically defined herein, the terminology used herein is to be given its traditional meaning as known in the relevant art.

Embodiments of the present invention include a small cell wireless networking device having a desired shape and electromechanical configuration for mounting on a light pole (See FIGS. 3A-8, for example). More particularly, embodiments are arranged with a certain NEMA-style connector integrated on one (e.g., bottom) side, which enables the device to be electromechanically coupled to the top side of a light fixture attached or otherwise integrated into the light pole. Some short exemplary cases are now summarized in a non-limiting descriptive way merely to facilitate understanding of the present disclosure through demonstration of certain embodiments.

Once arranged on a light fixture, the small cell networking device is enabled to provide services for the streetlight and services for mobile devices in proximity to this or other streetlights. In at least some cases, the small cell device is also arranged to provide still other additional services to one or more third party entities such as utilities, law enforcement, schools, and retail and wholesale businesses.

The small cell networking devices described herein will include one or more light sensors. Light sensors detect ambient light in proximity to the streetlight fixture. Using light sensor data, the small cell networking devices may control one or more characteristics of light produced by a light source mounted or otherwise integrated in the fixture.

The characteristics can include the volume of light output (i.e., lumens or luminous flux), the color or frequency of output light, on/off timing, situational lighting, and the like. In at least some cases, the characteristics of light output from one streetlight fixture are cooperative with characteristics of light output from other (e.g., adjacent) streetlight fixtures.

In addition to certain streetlight control features, the small cell networking devices described herein also provide cellular-based wireless communication services to mobile devices. For example, a user holding a smartphone can make or receive a telephone call that passes wireless cellular data through the small cell networking device. Using the small cell networking devices described herein, a mobile network operator (MNO) can supplement its cellular-based network with coverage in dense urban areas, areas in geographic regions that are otherwise "dark spots" in its network (e.g., valleys, places in the shadow of natural or manmade structures), in areas that are only periodically high-traffic areas (e.g., stadiums, arenas, show venues), in areas that are temporary (e.g., construction sites, disaster sites), and in other such areas.

In some cases, a single small cell networking device may include electronic circuits that provide small cell functionality to two or more MNOs in a single device. For example, in some cases, a single small cell networking device may have antennas, transceivers, controllers, and the like that permit two mobile devices provisioned for wireless communications on different cellular-based networks operated by different MNOs to carry on concurrent communication sessions (e.g., phone calls, internet sessions, etc.).

In some cases, the small cell networking device provides WiFi access point services to devices that are in proximity to the small cell networking device. These WiFi services are distinguished from cellular-based wireless communications because they do not necessarily require MNO provisioning in the manner that a mobile communication device requires provisioning. In these cases, for example, a small cell networking device may provide cellular-based service for a specific MNO, and the same small cell networking device may also provide WiFi services on behalf of a municipality that wants to provide free or low cost WiFi services to its residents.

The small cell networking devices described herein may in some cases be in communication with other small cell networking devices or other less sophisticated wireless communication devices. In at least one case, a geographic area has many streetlight poles. Some small cell networking devices are mounted on certain ones of the streetlight poles, and other less sophisticated wireless communication devices are mounted on other streetlight poles. These other less sophisticated wireless communication devices can each control characteristics of the light sources integrated on their respective light pole. In this type of system, however, due in part to the wireless capabilities of each device, and due in part to the sophistication of the small cell networking device, the lighting of the entire geographic area can be desirably and holistically controlled locally from the small cell networking device or remotely from a central site. And in still other systems of this configuration enable the implementation and control of a wide range of sensors, controllers, and other "smart" devices can be integrated to provide MNOs, utilities, government agencies, and the like with a range of services not previously available.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems, including client and server computing systems, as well as computing networks have not been shown or described in detail to avoid unnecessarily obscuring descriptions of the embodiments.

Figures 3A, 3B:
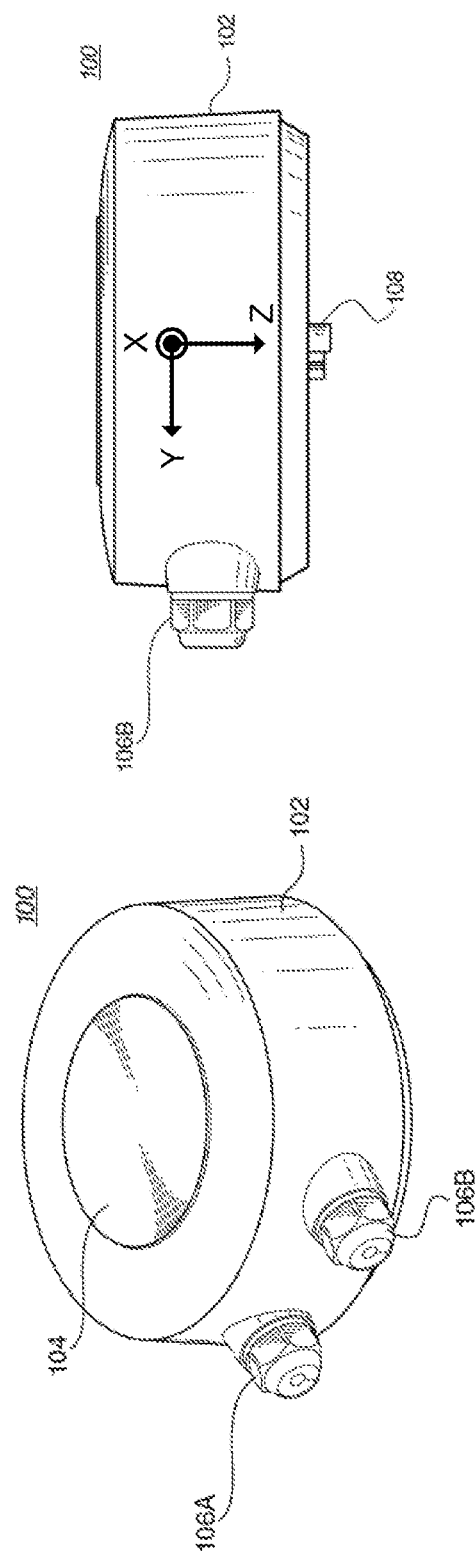
FIG. 3A is a perspective view of a small cell networking device according to one or more embodiments of the present disclosure.
FIG. 3B is a right side view of the small cell networking device embodiment of FIG. 3A.

FIG. 3A is a perspective view of a small cell networking device 100 embodiment. The small cell networking device 100 may be particularly arranged for mounting on a light pole, and even more particularly arranged for mounting on a light fixture (e.g., a luminaire). In these cases, the light fixture in at least some embodiments is aerially mounted between about 20 to 40 feet above the area to be illuminated (e.g., ground level, a roadway, a parking surface, and the like), and the light fixture is mounted on a light pole, a building, or some other structure. In some cases, the light poles, light fixtures, streetlights, buildings, roadways, parking surfaces, or any combination thereof are administered by a government entity.

The small cell networking device 100 of FIG. 3A may have a substantially cylindrical form factor wherein a horizontal cross section has a substantially circular shape. Other form factors and horizontal cross sectional shapes are of course considered. In at least some cases, the diameter of the small cell networking device 100 is between about six (6) inches and twelve (12) inches. In some embodiments, such as shown in the small cell networking device 100 of FIG. 3A, walls of the device are substantially vertical or within about 30 degrees of vertical. In other embodiment, walls of the small cell networking device that provide height to the device are segmented such that some portions of the wall are vertical or near-vertical and other portions of the wall structures are closer to horizontal. Many shapes, styles, and dimensions of wall structures have of course been considered. In at least some embodiments, the walls of the small cell networking device 100 are formed to create a height of the device between about 2.5 inches and six (6) inches.

The outer housing 102 of the small cell networking device 100 of FIG. 3A may be formed of plastic or some other material. In some cases, the outer housing 102 is painted, bonded, or otherwise coated with a weather-resistant material (e.g., a varnish, an enamel, a fluoropolymer, a powder-coating, or the like). The outer housing 102 includes a lid that is attached to the base of the outer housing 102 after the electrical components, which are described below, are installed within the small cell networking device 100. In some cases, the outer housing 102 is arranged in color, shape, material, or some other characteristic to be resistant to birds, insects, or other pests. For example, the outer housing 102 may be mirrored, low-friction, spiked, or enabled with vibration, heat, cooling, an audio transducer, or some other anti-pest feature. In at least some embodiments, the outer housing 102 is constructed according to a standard published by the International Electrotechnical Commission (IEC) as Ingress Protection standard IP55. A housing constructed and deployed to IP55 is generally sufficient to resist or otherwise prevent dust and other solid materials from entering the housing and also sufficient to resist or otherwise prevent low pressure liquid (e.g., water) jetted from any direction from entering the housing.

The small cell networking device 100 may include a light sensor module 104. The light sensor module 104 of FIG. 3A may or may not include a lens. The light sensor module, which may also be referred to as simply a light sensor, includes a light sensor surface that collects, absorbs, or otherwise detects photons, and an electronic circuit that generates a representation of light that is impacting the light sensor surface. The light sensor module 104 may be arranged to generate at least one light signal (e.g., an ambient light signal, a focused light signal, a data-infused light signal, or the like). Light signals generated by the light sensor module 104 may be digital values between a lower threshold and an upper threshold (e.g., between 0 bits and 1024 bits) that represent the amount of luminous flux (e.g., photons) that strike the light sensor module 104 at a particular point or within a particular time period. A processor-based light control circuit (not shown in FIG. 3A) may be arranged to provide a light control signal based on at least one ambient light signal generated by the light sensor module 104, and in these cases, the light control signal may be used to direct characteristics of light output from a light source integrated in the corresponding light fixture.

In FIG. 3A, the small cell networking device 100 includes a pair of twist lock connectors 106A, 106B that provide cable access to the inside of the small cell networking device 100. In at least some cases, the twist lock connectors 106A, 106B are water tight, and in these or in other cases, the twist lock connectors 106A, 106B provide strain relief to cables that pass through the connectors. The twist lock connectors 106A, 106B in at least some cases expose a gland connector for 3-15 mm diameter cable resistant to foreign material ingress according to Ingress Protection standard IP67.

FIG. 3B is a right side view of the small cell networking device 100 embodiment of FIG. 3A. The outer housing 102 and one of the twist lock connectors 106B is identified in the figure. Also identified in FIG. 3B is a multi-pin NEMA connector 108. In at least some embodiments the multi-pin NEMA connector 108 is compatible with an ANSI C136 standard promulgated by the National Electrical Manufacturers Association (NEMA). The multi-pin NEMA connector 108 may be compatible with the standard referred to as ANSI C136.41, ANSI C136.41-2013, or some other standard. Alternatively, the multi-pin NEMA connector 108 may be implemented with some other connector useful for external locking type photo-control devices for street and area lighting.

Figure 3C:
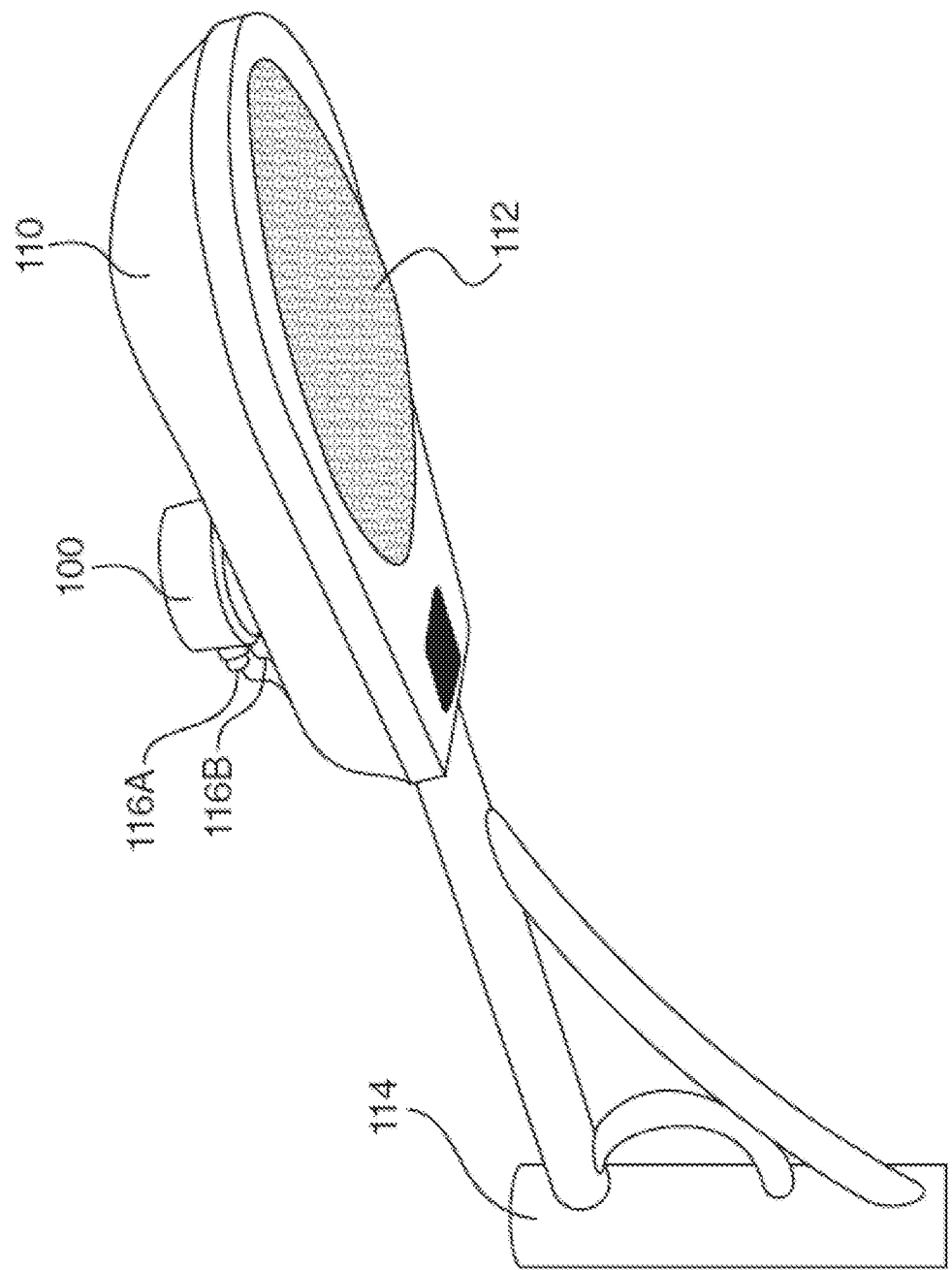
FIG. 3C is the small cell networking device embodiment of FIG. 3A mounted on a light fixture, which itself is coupled to a light pole.

FIG. 3C is the small cell networking device 100 mounted on a light fixture 110, which itself is coupled to a light pole 114. The light fixture 110 includes a light source 112. The light source 112 may be an incandescent light source, a light emitting diode (LED) light source, a high pressure sodium lamp, or any other type of light source. In the street light of FIG. 3C, the small cell networking device 100 is coupled to the light fixture 110 via the multi-pin NEMA connector 108. That is, the pins of the multi-ping NEMA connector 108 are electromechanically coupled to a compatible NEMA socket integrated into the light fixture 110. In some cases, the small cell networking device 100 replaces or otherwise takes the place of a different light sensor device, which does not have the features provided by the small cell networking device 100. Cables 116A, 116B are passed through the twist lock connectors 106A, 106B respectively of the small cell networking device 100. The cables 116A, 116B may be networking cables (e.g., Power over Ethernet (PoE)) cables, cables electrically coupled to other electronic circuits (e.g., cameras, transducers, weather devices, internet of things (IoT) devices, or any other type of device).

Figure 4:
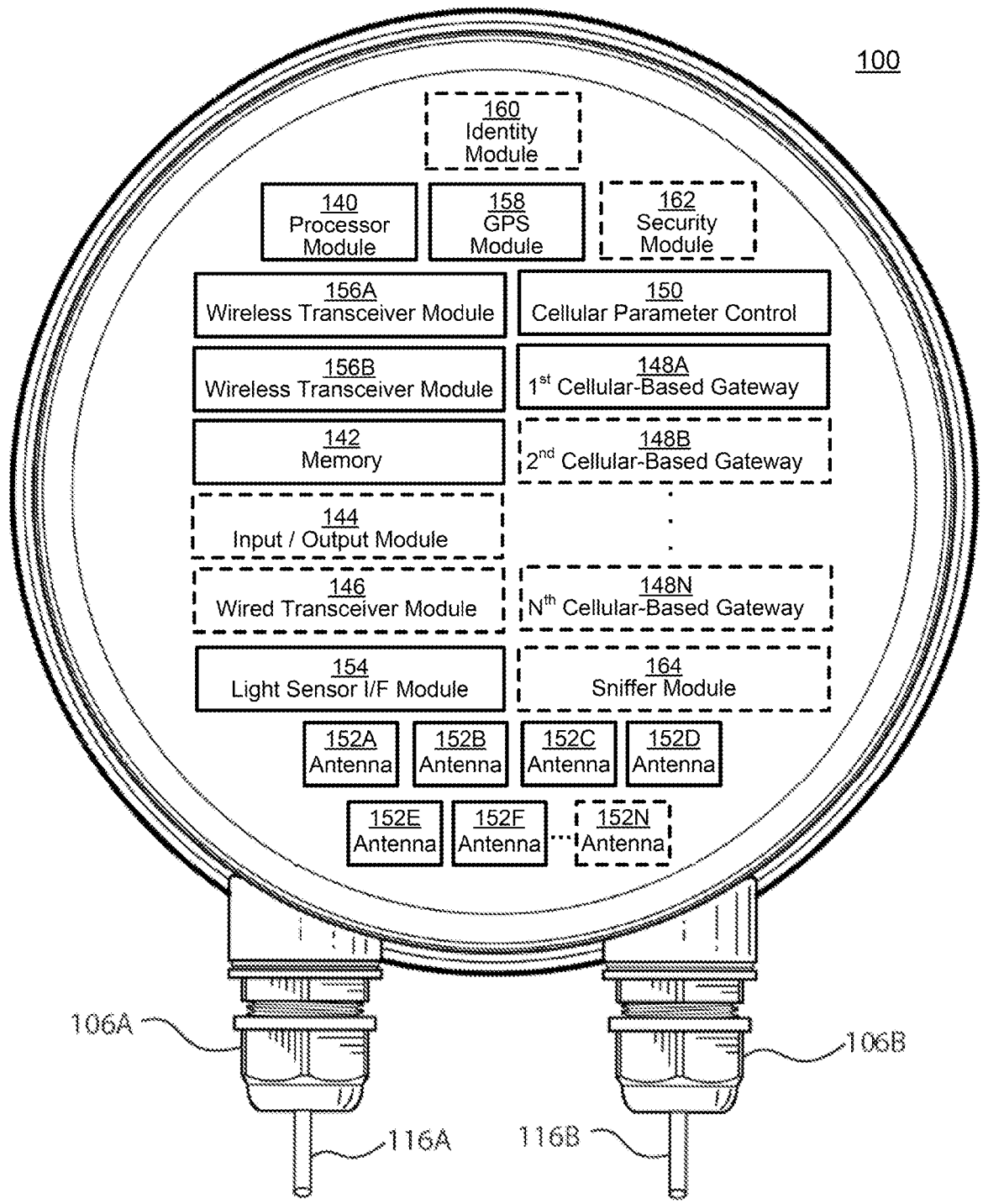
FIG. 4 is a small cell networking device block diagram.

FIG. 4 is a small cell networking device 100 block diagram. In the embodiment, a processor module 140 includes an applications processor as well as other peripheral circuitry for the processor such as power circuitry, clock circuitry, memory control circuitry, and the like. The processor module 140 is communicatively coupled to a memory module 142. The memory module 142 includes memory of one or more types, which may be desirably partitioned into small cell networking device owner areas, one or more MNO areas, one or more municipality areas, one or more third-party areas, global areas, executable code areas, parameter areas, system areas, sensor areas, IoT areas, secure areas, unlicensed communication areas, licensed communication areas, and other areas as selected or otherwise implemented by one or more computing professionals.

The small cell networking device 100 includes one or more optional input/output modules 144 and one or more optional wired transceiver modules 146. The embodiment of FIG. 4 illustrates first cable 116A electromechanically coupled to an input/output module 144 and second cable 116B electromechanically coupled to wired transceiver module 146, but other embodiments are not so limited. As discussed herein, the modular design of the small cell networking device 100 permits any desirable arrangement of cables through the twist lock connectors 106A, 1066 coupled to pass power, communications, control signals, or other information into, out from, or into and out from the small cell networking device 100.

The small cell networking device 100 includes at least one cellular-based gateway module 148A, which is a networking module arranged as a gateway to a cellular-based network. The cellular-based network is controlled by a mobile network operator (MNO). The cellular-based gateway module 148A enables functionality for a mobile device in proximity to the small cell networking device 100 to conduct a wireless communication session using the cellular-based network controlled by the MNO. The wireless communication session may be a cellular phone call, a short message service (e.g., text) message, an electronic mail, an internet session (e.g., delivery of multimedia information through a browser or other client software application on the mobile device), a tracking message, or any other type of communication that passes data over the MNO-controlled cellular-based network.

Optionally, the small cell networking device 100 includes a second cellular-based gateway module 148B, and any number of other cellular-based gateway modules 148N. By inclusion of multiple cellular-based gateways, the small cell networking device 100 enables a plurality of concurrent wireless communication sessions via the same or different MNO-controlled cellular-based networks.

Wireless communication sessions that are enabled through one or more cellular-based gateways 148A-148N may pass packetized data through one or more networking structures of the small cell networking device 100. In many cases, packetized data wirelessly received on the cellular-based network from at least one mobile device is communicated on or otherwise through a public switched telephone network (PSTN). The packetized data may be further communicated between the small cell networking device 100 and the PSTN in one or more ways. In some embodiments, the packetized data is passed through the same or another cellular-based gateway module 148A-148N to a cellular macrocell, to a landline, or to another small cell networking device 100. In some embodiments, the packetized data is passed through a wired transceiver module 146 (e.g., PoE, digital subscriber line (DSL), broadband cable, or the like) and a cable 116A, 116B to another computing device. In some embodiments, the packetized data is passed through a different cabled transceiver and cable 116A, 116B such as a fiber optic transceiver and cable medium. In still other cases, the packetized data is passed through a wireless transceiver module 150, which may be a WiFi (e.g., IEEE 802.11)

transceiver or a different type of wireless transceiver (e.g., licensed RF, unlicensed RF, satellite) that communicates according to a different protocol (e.g., a proprietary protocol, a satellite protocol, or some other protocol).

Operations of the one or more cellular-based gateways 148A-148N may be directed by a cellular-based parameter control module 150. In some cases, the cellular-based parameter control module 150 includes features that enable a small cell networking device 100 systems integrator or some other party to provision the small cell networking device 100 on a cellular-based network of a selected MNO. In this way, the MNO can itself provision each small cell networking device 100 for operation on the cellular-based network it controls, or the MNO can authorized another entity to provision the small cell networking device 100. The feature set provided by the cellular-based parameter control module 150 promote efficiency, cost-effectiveness, rapid-deployment, temporary deployment, one or more revenue models, and many other benefits.

The small cell networking device 100 includes a plurality of antennas to enable the wireless features of the device. Seven antennas are represented in FIG. 4, which include an antenna 152A, an antenna 152B, an antenna 152C, an antenna 152D, an fifth antenna 152E, an antenna 152F, and an antenna 152N. Each antenna may be physically formed, arranged, positioned, and oriented to advantageously provide favorable communication of data. In some cases, one or more antennas are arranged to communicate data on a cellular-based network. In some cases, one or more antennas provide signal-sniffing capabilities. In some cases, one or more antennas are arranged to wirelessly communicate data on a non-cellular, licensed or unlicensed frequency or frequency spectrum as the case may be. In some cases the radial design of the casted small cell cover will be used to enhance antenna performance.

A light sensor interface module 154 is included in the small cell networking device 100. The light sensor interface module 154 may include or otherwise enable light sensor functionality for one or more light sources such as a streetlight arranged in a light fixture that is coupled to the small cell networking device 100. In some cases, the light sensor interface module 154 communicates with a light sensor module 104 (FIG. 3A). In other cases, a light sensor module 104 is integrated with the light sensor interface module 154. The processor of processor module 140 may direct the operations of a light source based on data generated or otherwise provided by the light sensor interface module 154. For example, when ambient light in proximity to the small cell networking device 100 reaches one or more lower threshold, the light source may be directed to turn on or otherwise increase its light output. Conversely, when the ambient light in proximity to the small cell networking device 100 reaches one or more upper thresholds, the light source may be directed to turn on or otherwise decrease its light output. In some cases, the processor intelligently directs the operation of an associated light source based on information received from any of the available transceivers. In this way, for example, when a first light source from a nearby light pole is undesirably reduced in intensity, a second light source in close proximity may be directed to increase its intensity. As another example, a municipality, law enforcement agency, third-party private entity, or some other entity may intelligently control light output from a plurality of light sources. The intelligent light control of a plurality of light sources may be used for safety, advertising, celebration, crowd control, or any number of other reasons. In at least one embodiment, the small cell networking device 100 wireless communicates its light sensor data to another smart device. In this embodiment or other embodiments, the small cell networking device 100 wirelessly receives light sensor data from one or more other smart devices.

The wireless transceiver module 156A may provide wireless communication capability to any one or more devices having corresponding wireless transceivers. In some cases, for example, using functionality provided by the wireless transceiver module 156A, the small cell networking device 100 is arranged to operate as a WiFi access point. In this way, the small cell networking device 100 permits one or more mobile devices to access the Internet. Municipalities or other entities may make internet services available over a determined geographic area (e.g., a neighborhood, a city, an arena, a construction site, a campus, or the like) to remote mobile devices that are in proximity to any one of a plurality of small cell networking devices 100. For example, if many street light fixtures in a neighborhood or city are equipped with a small cell networking device 100, then WiFi service can be provided to a large number of users. What's more, based on seamless communication between a plurality of small cell networking devices 100, the WiFi service can be configured as a mesh that permits users to perceive constant internet connectivity even when the mobile device is in motion.

The wireless transceiver module 156B may provide wireless communication capability to any of one or more devices having corresponding wireless transceivers. In some cases, for example, using functionality provided by the wireless transceiver module 156B, the small cell networking device 100 is arranged to operate as a Bluetooth access point. In this way, the small cell networking device 100 permits one or more mobile devices to communicate with the small cell networking device 100, for example, to access the Internet. The wireless transceiver module 156B may provide capabilities that are similar to the capabilities of the wireless transceiver module 156A described above. In one or more embodiments, the wireless transceiver module 156A and the wireless transceiver module 156B are included in the same integrated circuit.

A global positioning system (GPS) module 158 is arranged in small cell networking device 100. The GPS module 158 is arranged to determine a location of the small cell networking device 100, for example, using signals received from GPS satellites. The GPS module 158 permits the small cell networking device 100 to accurately report its position to another computing device. In some cases, the position may be used to positively identify the particular small cell networking device 100. In some cases, the position may be used to expressly direct service personnel to the site where the small cell networking device 100 is installed. The position information can be used diagnostically when a light source is failing, when an IoT device or some other sensor reports any type of information, and for other reasons. The highly accurate time-base of the GPS module may also be used by the small cell networking device 100 for weather data, almanac data, signal triangulation with other small cell networking devices 100, or for other purposes.

In some cases, an optional identity module 160 is arranged in the small cell networking device 100. The identity module 160 may include electronic, mechanical, or electromechanical switch circuitry, memory, a random number, a random number generator, a system-wide unique identifier, a world-wide unique identifier, or other such information. When combined with position information from the GPS module 158, the small cell networking device 100 may be able to more accurately report its identity and position to another computing device. The identity information can be used diagnostically and for other reasons. In at least some cases, identity information provided by an identity module is used as a network identifier for the small cell networking device 100. The identity information may be arranged as a 32-bit number, a 64-bit number, another number having a structurally preferable bit-width, a combination of information that further conveys information about the capabilities of the small cell networking device 100 (e.g., date of deployment, year of deployment, hardware version number, software version number, geographic location, or other such information).

A security module 162 is also optionally included in some embodiments of a small cell networking device 100. The security module 162 may include one or more of an encryption engine, a decryption engine, a random number generator, a secure memory, a separate processing device, and the like.

A sniffer module 164 is also optionally included in some embodiments of a small cell networking device 100. The sniffer module 162 is arranged to at least receive signals transmitted on one or more of the cellular-based networks that are accessible by the cellular-based gateway modules 148A-148N.

Figure 5:
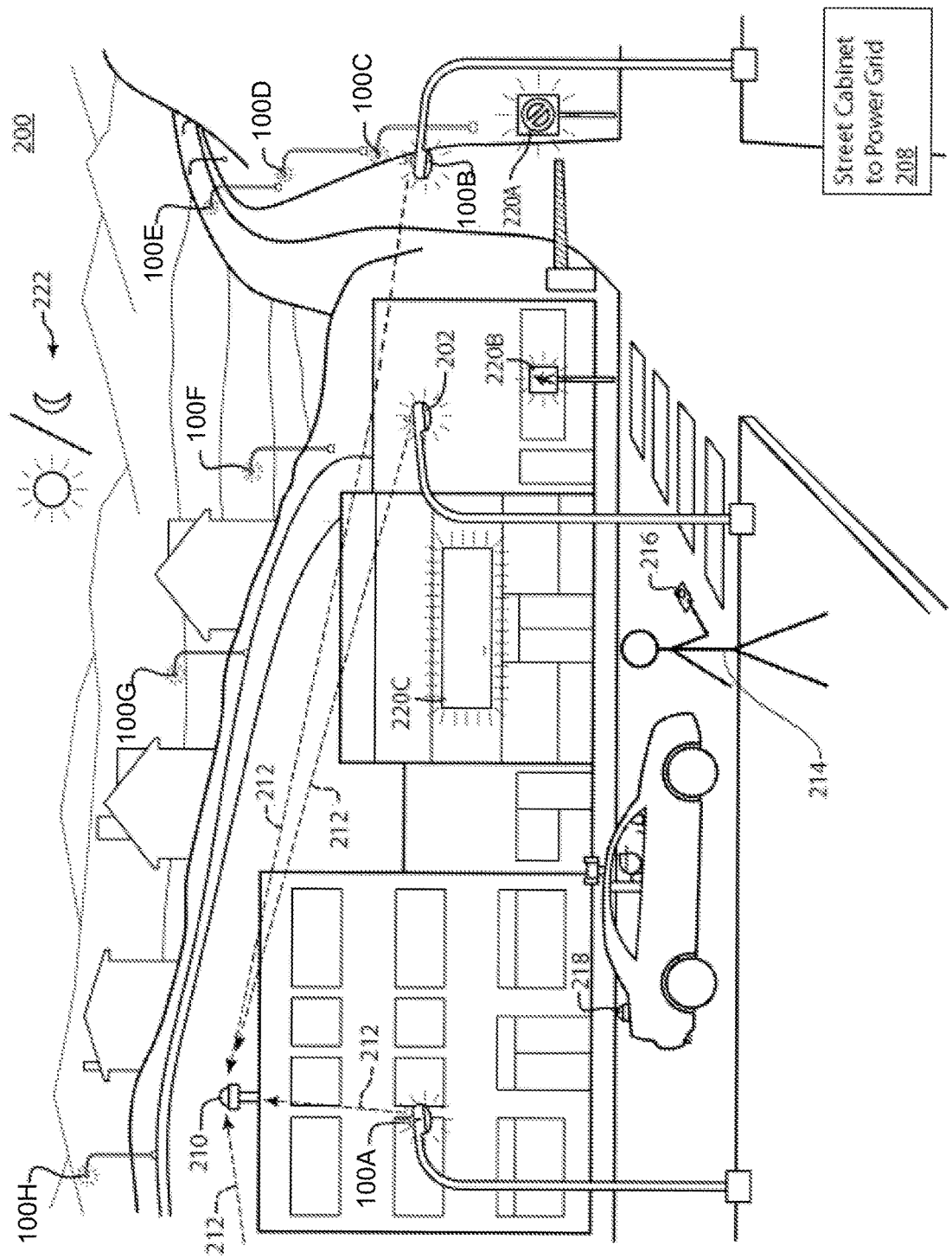
FIG. 5 is a system level deployment having a plurality of small cell networking devices coupled to streetlight fixtures.

FIG. 5 is a system level deployment 200 having a plurality of small cell networking devices 100A-100H coupled to streetlight fixtures. The streetlight fixtures are coupled to or otherwise arranged as part of a system of streetlight poles, each streetlight fixture includes a light source. Each light source, light fixture, and light fitting, individually or along with their related components, may in some cases be interchangeably referred to as a luminaire, a light source, a streetlight, a streetlamp, or some other such suitable term.

As shown in the system level deployment 200, a plurality of light poles are arranged in one or more determined geographic areas, and each light pole has at least one light source positioned in a fixture. The fixture is at least twenty feet above ground level and in at least some cases, the fixtures are between about 20 feet and 40 feet above ground level. In other cases, the streetlight fixtures may of course be lower than 20 feet above the ground or higher than 40 feet above the ground. In other cases, the streetlight fixtures may of course be lower than 20 feet above the ground or higher than 40 feet above the ground. Although described as being above the ground, streetlight fixtures may also be subterranean, but positioned above the floor, such as in a tunnel.

The system of streetlight poles, streetlight fixtures, streetlight sources, or the like in the system level deployment may be controlled by a municipality or other government agency. In other cases, the system streetlight poles, streetlight fixtures, streetlight sources, or the like in the system level deployment is controlled by a private entity (e.g., private property owner, third-party service contractor, or the like). In still other cases, a plurality of entities share control of the system of streetlight poles, streetlight fixtures, streetlight sources, or the like. The shared control may be hierarchical or cooperative in some other fashion. For example, when the system is controlled by a municipality or a department of transportation, an emergency services agency (e.g., law enforcement, medical services, fire services) may be able to request or otherwise take control of the system. In still other cases, one or more sub-parts of the system of streetlight poles, streetlight fixtures, streetlight sources, or the like can be granted some control such as in a neighborhood, around a hospital or fire department, in a construction area, or in some other manner.

In the system level deployment 200 of FIG. 5, any number of streetlight fixtures may be arranged with a connector that is compliant with a roadway area lighting standard promoted by a standards body. The connector permits the controlling or servicing authority of the system to competitively and efficiently purchase and install light sensors on each streetlight fixture. In addition, or in the alternative, the standardized connector in each streetlight fixture permits the controlling or servicing authority to replace conventional light sensors with other devices such as a small cell networking device 100 or some other device.

In the system level deployment 200, one of the small cell networking devices 100A-100H is electromechanically coupled to a selected light pole wherein the electromechanical coupling is performed via the connector that is compliant with the roadway area lighting standard promoted by a standards body. Stated differently, the system level deployment 200 includes a plurality of light poles each having one of the small cell networking devices 100A-100H coupled thereto. In these light poles, each streetlight fixture is equipped with one of the small cell networking devices 100A-100H via a respective connector that is compliant with the roadway area lighting standard promoted by the standards body. In this arrangement, each selected streetlight 202 is equipped with one of the small cell networking devices 100A-100H having a light sensor that is further electrically coupled to a processor-based light control circuit.

The processor-based light control circuit of each small cell networking device 100A-100H is arranged to provide a light control signal to the respective light source based on at least one ambient light signal generated by its associated the light sensor. In addition, because each streetlight 202 is equipped with communication capabilities, each light source in each streetlight 202 can be controlled remotely as an independent light source or in combination with other light sources. In these cases, each of the plurality of light poles and fixtures with a small cell networking device 100-100H is communicatively coupled together. The communicative relationship among each of the plurality of light poles and fixtures with a small cell networking device 100A-100H may be a direct communication or an indirect communication. That is, in some cases, a first one of the plurality of light poles and fixtures with a first one of the small cell networking devices 100A-100H may communicate directly with a second light pole and fixture with a second one of the small cell networking devices 100A-100H, or the first one of the plurality of light poles and fixtures with the first one of the small cell networking devices 100A-100H may communicate via one of the plurality of light poles and fixtures with a third one of the small cell networking devices 100A-100H that can communicate with the second one of the small cell networking device 100A-100H.

In the system level deployment 200 of FIG. 5, various ones of the light poles may be 50 feet apart, 100 feet apart, 250 feet apart, or some other distance. In some cases, the type and performance characteristics of each small cell networking devices 100A-100H are selected based on their respective distance to other such devices such that wireless communications are acceptable.

Each light pole and fixture with a small cell networking device 100A-100H is coupled to a street cabinet 208 or other like structure that provides utility power (e.g., "the power grid") in a wired way. The utility power may provide 120 VAC, 240 VAC, 260 VAC, or some other power source voltage. In addition, one or more of the light poles and fixtures with small cell networking devices 100A-100H, are also coupled to the same street cabinet 208 or another structure via a wired backhaul connection. It is understood that these wired connections are in some cases separate wired connections (e.g., copper wire, fiber optic cable, industrial Ethernet cable, or the like) and in some cases combined wired connections (e.g., power over Ethernet (PoE), powerline communications, or the like). For simplification of the system level deployment 200 of FIG. 5, the wired backhaul and power line 206 is illustrated as a single line. The street cabinet 208 is coupled to the power grid, which is administered by a licensed power utility agency, and the street cabinet 208 is coupled to the public switched telephone network (PSTN).

Each light pole and fixture with one of the small cell networking devices 100A-100H is in direct or indirect wireless communication with a light pole and fixture with another one of the small cell networking devices 100A-100H. In addition, each light pole and fixture with one of the small cell networking device 100A-100H may also be in direct or indirect wireless communication 212 with an optional remote computing device 210. The remote computing device 210 may be controlled by an MNO, a municipality, another government agency, a third party, or some other entity. By this optional arrangement the remote computing device can be arranged to wirelessly communicated light control signals and any other information (e.g., packetized data) between itself and each respective wireless networking device coupled to any of the plurality of light poles.

A user 214 holding a mobile device 216 is represented in the system level deployment 200 of FIG. 5. A vehicle having an in-vehicle mobile device 218 is also represented. The vehicle may be an emergency service vehicle, a passenger vehicle, a commercial vehicle, a public transportation vehicle, a drone, or some other type of vehicle. The user 214 may use the mobile device 216 to establish a wireless communication session over a cellular-based network controlled by an MNO, wherein packetized wireless data is passed through the light pole and fixture with a small cell networking device 100. Concurrently, the in-vehicle mobile device 218 may also establish a wireless communication session over the same or a different cellular-based network controlled by the same or a different MNO, wherein packetized wireless data of the second session is also passed through the light pole and fixture with one of the small cell networking devices 100A-100H.

Other devices may also communicate through light pole-based devices of the system level deployment 200. These devices may be internet of things (IoT) devices or some other types of devices. In FIG. 5, two public information signs 220A, 220B, and a private entity sign 220C are shown, but many other types of devices are contemplated. Each one of these devices may form an unlicensed wireless communication session (e.g., WiFi) or a cellular-based wireless communication session with one or more wireless networks made available by the devices shown in the system level deployment 200 of FIG. 5.

The sun and moon 222 are shown in FIG. 5. Light or the absence of light based on time of day, weather, geography, or other causes provide information (e.g., ambient light) to the light sensors of the light pole mounted devices described in the present disclosure. Based on this information, the associated light sources may be suitably controlled.

Figure 6:
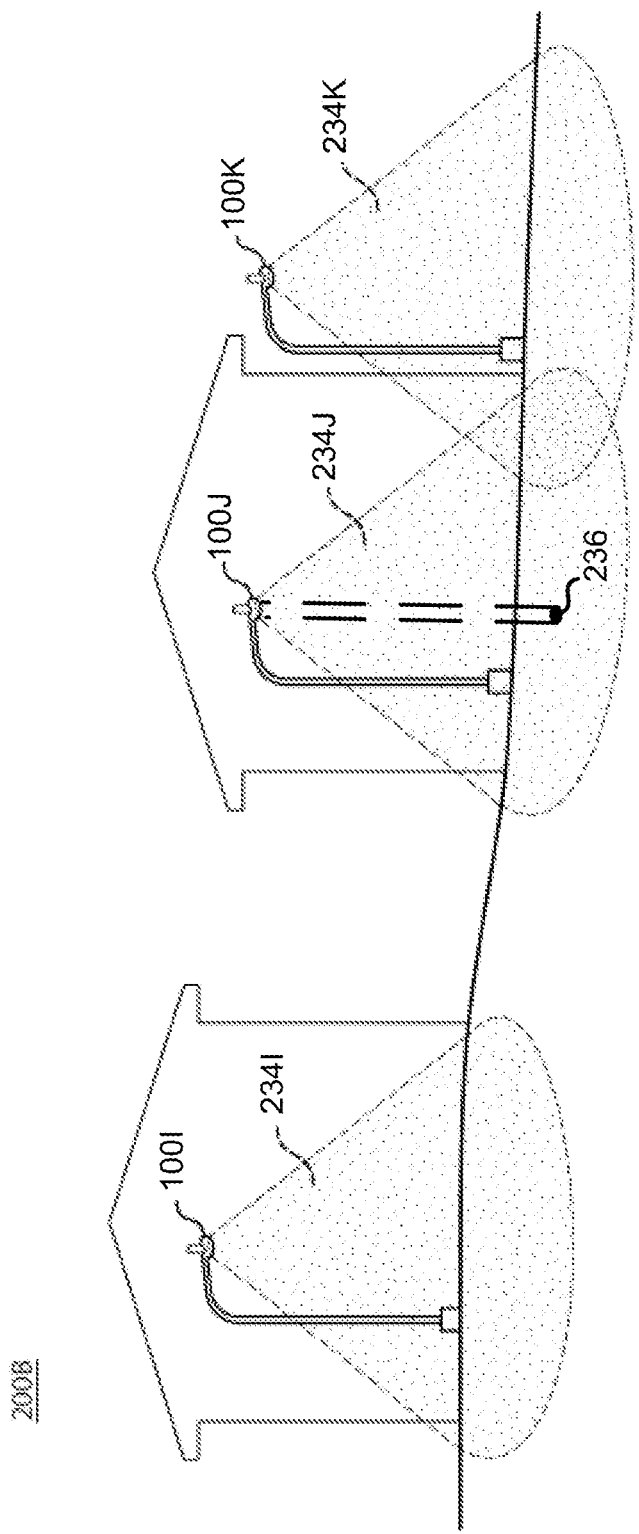
FIG. 6 is one more partial system level deployment.

FIG. 6 is one more partial system level deployment 200B. In the partial system level deployment 200B, three light poles and fixtures with small cell networking devices 100I, 100J, and 100K are shown. In some cases, a light sensor detects both ambient light from above its respective fixture and other light from different directions. For example, where light from two light sources overlap, one or more of the small cell networking devices 100I, 100J, and 100K may adjust their light output. The adjustment may be a reduction in light output, a directional change to light output, or some other adjustment. Along these lines, where light from two light sources do not overlap at all, there may be areas in need of additional illumination. In this case, one or more of the small cell networking devices 100I, 100J, and 100K 120 may adjust their light output. In some cases, the small cell networking devices 100I, 100J, and 100K are arranged to dynamically detect motion and adjust light output to increase, decrease, or change other parameters such as direction of light output as the motion is directionally detected.

Light is output in an approximately conical shape 234I by the light source of the light fixture (not labeled in FIG. 6) on which the small cell networking device 100I is mounted. Light is also output in an approximately shape 234J by the light source of the light fixture (not labeled in FIG. 6) on which the small cell networking device 100J is mounted. In addition, light is output in an approximately shape 234K by the light source of the light fixture (not labeled in FIG. 6) on which the small cell networking device 100K is mounted. The light fixture (not labeled in FIG. 6) on which the small cell networking device 100J is mounted may be formed from a metallic material, for example, that blocks signals transmitted to and from the small cell networking device 100J. This may be particularly problematic when a user is located directly below the light fixture, for example, in an area 236 shown in FIG. 6. One or more of the antennas 152A-152N are placed at locations that mitigate or obviate this problem, as discussed below in connection with FIG. 7.

Figure 7:
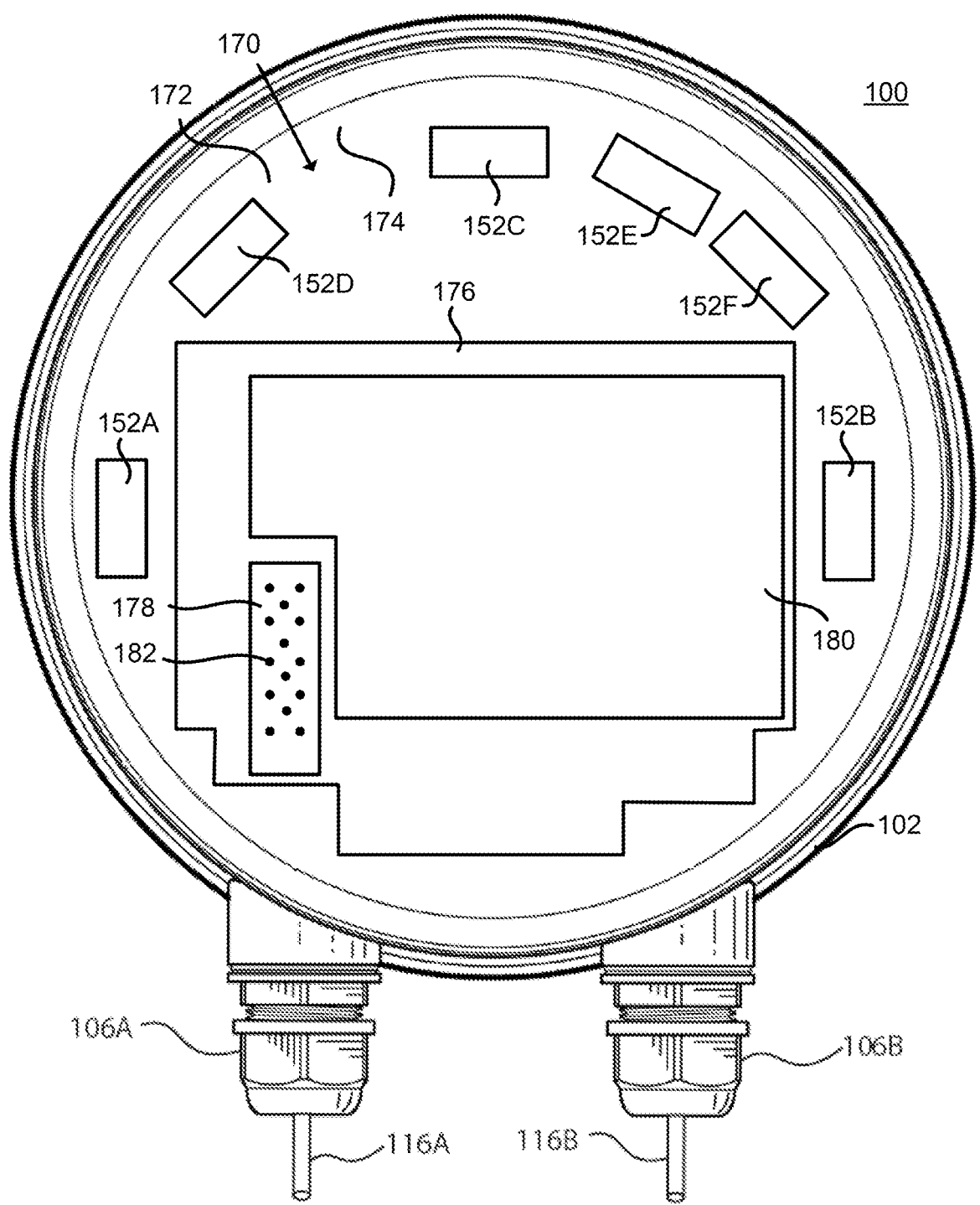
FIG. 7 is a physical layout of a small cell networking device.

FIG. 7 is a physical layout of a small cell networking device 100. FIG. 7 is top view of the small cell networking device 100 shown with its lid removed from the base of the outer housing 102 to facilitate the discussion that follows.

As shown in FIG. 7, the small cell networking device 100 includes an internal compartment 170 that is defined by a lower surface 172 and a side surface 174 that extends upwardly from the lower surface 172 along the periphery of the lower surface 172. In one or more embodiments, the lower surface 172 is a planar surface having a circular shape. In one or more embodiments, the side surface 174 provides a wall of a substantially cylindrical body. Any number of internal "walls," support structures, or other such formations may also be arranged to extend upwardly from the lower surface 172 thereby forming compartments, or surfaces for mounting, shielding, or some other purpose. When the small cell networking device 100 is fully assembled, the lid is attached to the base portion of the outer housing 102. The lid, the lower surface 172, and the side surface 174 form an enclosure that prevents moisture and dirt, for example, from entering the compartment 170 from outside of the small cell networking device 100.

A printed circuit board 176 is disposed within the small cell networking device 100 in the embodiment of FIG. 7. The printed circuit board 176 is mounted to the lower surface 172 of the compartment 170, for example, using a plurality of screws, adhesives, friction-fit or click-fit standoffs, or some other fastening means (not shown). The printed circuit board 176 contains conductive traces (not shown) that interconnect the various electrical components mounted on the printed circuit board 176. In one or more embodiments, at least one additional printed circuit board is disposed below the printed circuit board 176. In other words, the printed circuit board 176 may be located at the top of a stack of printed circuit boards. In one or more embodiments, the wireless transceiver module 156A, wireless transceiver module 156B, cellular-based gateway module 148A, cellular-based gateway module 148B, and GPS module 158 are mounted on the printed circuit board 176. In one or more embodiments, the wireless transceiver module 156A, wireless transceiver module 156B, cellular-based gateway module 148A, cellular-based gateway module 148B, and GPS module 158 are mounted on at least one of the printed circuit boards included a stack of printed circuit boards that includes the printed circuit board 176.

A first RF shield plate 178 and a second RF shield plate 180 are mounted to the printed circuit board 176, for example, using a plurality of screws, solder, an adhesive, or some other fastening (not shown). The first RF shield plate 178 and the second RF shield plate 180 are disposed above electrical components that are susceptible to RF co-site interference, for example, electrical components that process signals received from user devices, including the wireless transceiver module 156A, wireless transceiver module 156B, cellular-based gateway module 148A, cellular-based gateway module 148B, and GPS module 158. The first RF shield plate 178 and the second RF shield plate 180 are formed from a metal, for example, copper or nickel in some cases, or from some other shielding means such as a metal or carbon infused foam, a foil, a metalized fabric, or the like. The first RF shield plate 178 has a plurality of apertures 182 formed therethrough. Thus, the first RF shield plate 178 enables air to flow therethrough, for example, to facilitate cooling of one or more electrical component disposed between the first RF shield plate 178 and the printed circuit board 176. It is noted that, in order to explain the physical layout of the antennas 152C-152F, another printed circuit board that may be mounted above the antennas 152C-152F is not shown in FIG. 7.

The antenna 152A in the embodiment of FIG. 7 is mounted to the lower surface 172 of the compartment 170, for example, using a suitable adhesive material. The antenna 152A is communicatively coupled to the cellular-based gateway module 148A, for example, using a cable or wire. The antenna 152A is disposed on or otherwise adjacent to the lower surface 172 between the side surface 174 and the printed circuit board 176, on a first side of the compartment 170 (e.g., left side of the compartment 170 shown in FIG. 7). In one or more embodiments, the antenna 152A is configured (e.g., sized and shaped) to transmit and receive signals in Band 4 (i.e., 1710-1755 MHz for uplink communications and 2110-2155 MHz for downlink communications) defined by the Long Term Evolution (LTE) standard for high-speed wireless communication for mobile devices and data terminals, which is promulgated by the 3rd Generation Partnership Project (3GPP). LTE is based on the Global System for Mobile communications (GSM)/Enhanced Data rates for GSM Evolution (EDGE) and Universal Mobile Telecommunications System (UMTS)/High Speed Packet Access (HSPA) protocols and technologies.

In one or more embodiments, the antenna 152A is a Planar Inverted-F Antenna (PIFA) that is formed from a suitable metal, for example, copper. In one or more embodiments, the antenna 152A is a PIFA that is formed from a Flexible Printed Circuit (FPC), for example, made using a photolithographic technology or by laminating copper strips between layers of polyethylene terephthalate (PET). In one or more embodiments, the antenna 152A is configured to transmit signals to and receive signals from a first MNO and/or devices used by subscribers of the first MNO.

The antenna 152B in the embodiment of FIG. 7 is mounted to the lower surface 172 of the compartment 170, for example, using a suitable adhesive material. The antenna 152B is communicatively coupled to the cellular-based gateway module 148B, for example, using a cable or wire. The antenna 152B is disposed on or otherwise adjacent to the lower surface 172 between the side surface 174 and the printed circuit board 176, on a second side of the compartment (e.g., right side of the compartment 170 shown in FIG. 7), wherein the second side of the printed circuit board 176 is opposite the first side of the printed circuit board 176. In one or more embodiments, the antenna 152B is configured to transmit and receive signals in LTE Band 4. In one or more embodiments, the antenna 152B is a PIFA that is formed from a suitable metal, for example, copper. In one or more embodiments, the antenna 152B is a PIFA that is formed from a FPC. In one or more embodiments, the antenna 152B is configured to transmit signals to and receive signals from a second MNO and/or devices used by subscribers of the second MNO.

In one or more embodiments, antenna 152B is substantially alike antenna 152A. In other embodiments, antennas 152A and 152B substantially alike in appearance, but formed of different materials or different material dimensions. In these or still other embodiments, antennas 152A and 152B substantially alike and an electrical connection to each respective antenna is formed at a different location.

The antenna 152C in the embodiment of FIG. 7 is mounted to the lower surface 172 of the compartment 170, for example, using a suitable adhesive material. In one or more embodiments, the antenna 152C is communicatively coupled to the sniffer module 164, for example, using a cable or wire. In one or more embodiments, the antenna 152C is communicatively coupled to a third cellular-based gateway module, for example, using a cable or wire. The antenna 152C is disposed on or otherwise adjacent to the lower surface 172 between the side surface 174 and the printed circuit board 176, on a third side of the printed circuit board 176 (e.g., upper side of the compartment 170 shown in FIG. 7), wherein the third side of the printed circuit board 176 is different from the first and second sides of the printed circuit board 176. In one or more embodiments, the antenna 152C is configured to transmit and receive signals in LTE Band 4. In one or more embodiments, the antenna 152C is a PIFA that is formed from a suitable metal. In one or more embodiments, the antenna 152C is a PIFA that is formed from a FPC. The antenna 152C may be configured to transmit signals to and receive signals from the third MNO and/or devices used by subscribers of the third MNO. In one or more embodiments, antenna 152C is substantially alike antenna 152A and the second antenna 152C. In one or more embodiments, the antenna 152C is configured to sniff or listen (i.e., receive without transmitting) for signals in LTE Band 2 and/or LTE Band 4 from the first or second MNO and/or devices used by subscribers of the first or second MNO.

The antenna 152D in the embodiment of FIG. 7 is mounted to the lower surface 172 of the compartment 170, for example, using a suitable adhesive material. The antenna 152C is communicatively coupled to the GPS module 158, for example, using a cable or wire. The antenna 152D is disposed on or otherwise adjacent to the lower surface 172 between the antenna 152A and the antenna 152C. In one or more embodiments, the antenna 152D is configured to receive signals with a frequency of 1575 MHz, which are transmitted by satellites that are part of the Global Positioning System (GPS). In one or more embodiments, the antenna 152D is a ceramic patch surface mount technology (SMT) antenna. For example, the antenna 152D is an antenna having a part number of DSGP.1575.25.4.A.02 from Taoglas Antenna Solutions.

The antenna 152E in the embodiment of FIG. 7 is mounted to the lower surface 172 of the compartment 170, for example, using a suitable adhesive material. The antenna 152E is communicatively coupled to the wireless transceiver module 156A, for example, using a cable or wire. The antenna 152E is disposed on or otherwise adjacent to the lower surface 172 between the antenna 152B and the antenna 152C. In one or more embodiments, the antenna 152E is configured to transmit and receive signals with a frequency in a 2.4 GHz band that is used for WiFi communications. In one or more embodiments, the antenna 152E is configured to transmit and receive signals with a frequency in a 5 GHz band that is used for WiFi communications. In one or more embodiments, the antenna 152E may include an antenna for the 2.4 GHz band and an antenna for the 5 GHz band. For example, the antenna 152E is an antenna having a part number of GC-ANT-WIFI-BD from Grid Connect Inc.

The antenna 152F in the embodiment of FIG. 7 is mounted to the lower surface 172 of the compartment 170, for example, using a suitable adhesive material. The antenna 152E is communicatively coupled to the wireless transceiver module 156B, for example, using a cable or wire. In one or more embodiments, the antenna 152F is disposed on or otherwise adjacent to the lower surface 172 between the antenna 152E and the antenna 152C. In one or more embodiments, the antenna 152F is disposed on or otherwise adjacent to the lower surface 172 between the antenna 152D and the antenna 152A. In one or more embodiments, the antenna 152F is configured to transmit and receive signals with a frequency in a 2.4 GHz band that is used for Bluetooth communications. For example, the antenna 152F is an antenna having a part number of XP75 2.4 GHz Flex Super Micro PCB Antenna from Taoglas Antenna Solutions.

As described herein, antennas 152A-152F in some embodiments may be mounted in the internal cavity formed as compartment 170 using an adhesive. It is recognized that the adhesive may be any desirable adhesive means including, but not limited to, an acrylic, an epoxy, a polyurethane, a silicone, a polyimide, and the like. It is further recognized that antennas 152A-152F are described herein as disposed on or otherwise adjacent to lower surface 172. In these or other cases, one or more of the antennas may be mounted on the lower surface 172, while others of the antennas are mounted on the side surface 174 or some other structure within the compartment 170. In some cases, one or more of antennas 152A-152F are integrally formed directly in the side surface 174 of the outer housing 102.

In the embodiment of FIG. 7, placement of each of the first, second, third, fourth, fifth, and sixth antennas 152A-152F, the printed circuit board 176, the first RF shield plate 178, and the second RF shield plate 180, as described herein, has been carefully selected to reduce undesirable effects of RF co-site interference, and to provide an adequate RF signal coverage area, including in area directly below light fixtures on which the small cell networking device 100 is disposed. More particularly, the shapes of the radiation patterns, frequencies, and power levels at which the antennas 152A-152F are to be operated has been considered in determining the placement of the first, second, third, fourth, fifth, and sixth antennas 152A-152F. In addition, the placement of the printed circuit board 176, the first RF shield plate 178, and the second RF shield plate 180 has been carefully selected to ensure a compact design while enabling air to sufficiently cool electronic components. Accordingly, the placement of the first, second, third, fourth, fifth, and sixth antennas 152A-152F, the printed circuit board 176, the first RF shield plate 178, and the second RF shield plate 180 is more than simply design choice. Instead, the particular arrangement of components described in the present disclosure has been invented to solve specific problems and provide desirable benefits.

In one or more embodiments, the antenna 152A and the antenna 152B are configured to receive and transmit signals in LTE Band 4, the antenna 152C is configured to receive signals in LTE Bands 2 and 4, the antenna 152D is configured to receive GPS signals, the antenna 152E is configured to transmit and receive 5 GHz WiFi signals, and the antenna 152F is configured to transmit and receive Bluetooth signals. In such embodiments, the placement of the antenna 152A and the antenna 152B may be deemed to be particularly important because the antenna 152A and the antenna 152B transmit signals with a relatively high power level compared to the power levels of signals transmitted by the antenna 152E and the antenna 152F.

The inventors of the present disclosure performed testing and experimentation using a plurality of different types of antennas for the antenna 152A and the antenna 152B. More particularly, in at least one first set of experiments, each of the antenna 152A and the antenna 152B is a PIFA type of antenna that is made from metal. In at least one second set of experiments, each of the antenna 152A and the antenna 152B is a PIFA type of antenna that is made from a FPC. In these and other sets of experiments, signals were transmitted from each of the antenna 152A and the antenna 152B at a variety of frequencies, including 1710 MHz, 1732 MHz, 1755 MHz, 2110 MHz, 2132 MHz, and 2155 MHz. Measurements were taken at each of a plurality of locations around the small cell networking device 100, at orientations ranging from zero degrees to three-hundred-sixty degrees in each of at least an XZ-plane and a YZ-Plane (see FIG. 3B for indicators of the X, Y, and Z directions). The return loss of each antenna and the degree of isolation of both antennas were also calculated. Various radiation patterns of each antenna were measured and plotted. In addition, the efficiency and peak gain were calculated, as shown in Tables 1-4 below.

Figure 8A:
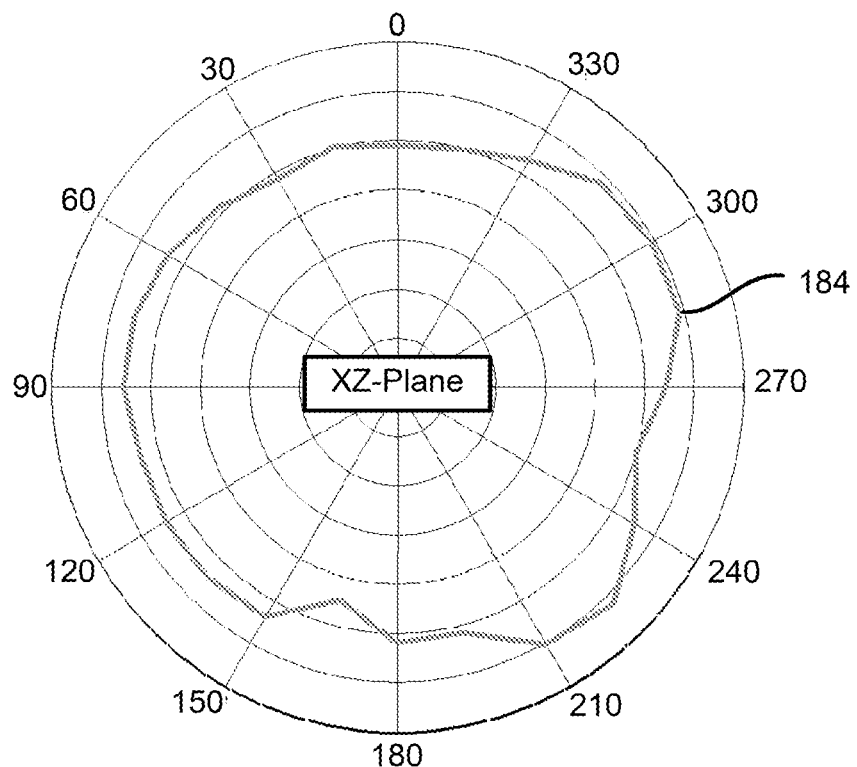
FIGS. 8A and 8B are radiation patterns of an antenna shown in FIG. 7.
Figure 8B:
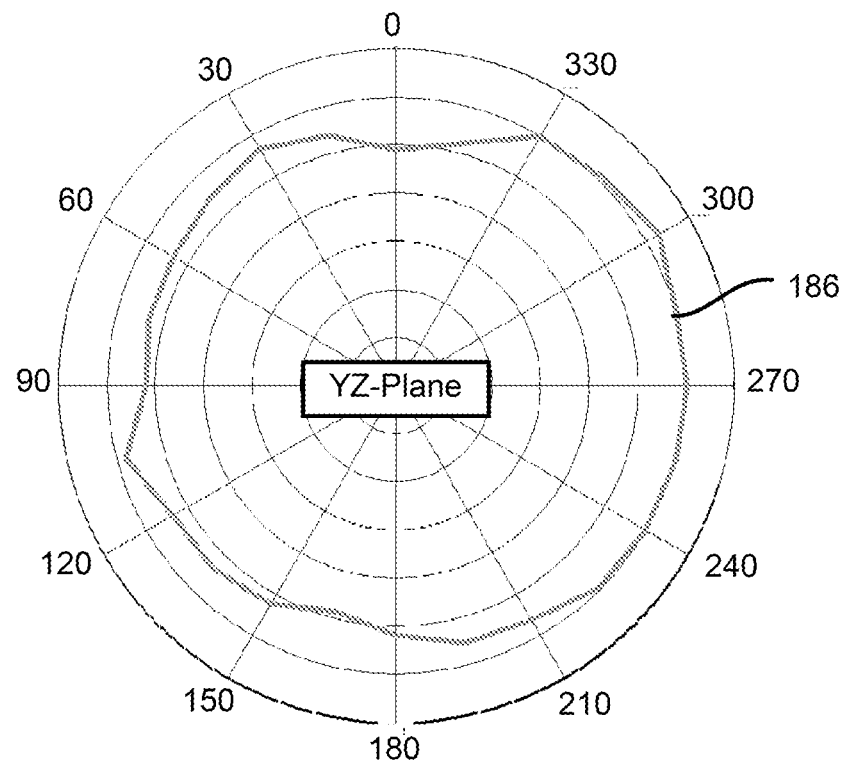

FIG. 8A is a radiation pattern 184 of the antenna 152A in the XY-Plane, based on measurements taken during a set of experiments while the antenna 152A transmits signals having a center frequency of 1755 MHz. FIG. 8B is a radiation pattern 186 of the antenna 152A in the YZ-Plane, based on measurements taken during a set of experiments while the antenna 152A transmits signals having a center frequency of 1755 MHz.

Figure 9A:
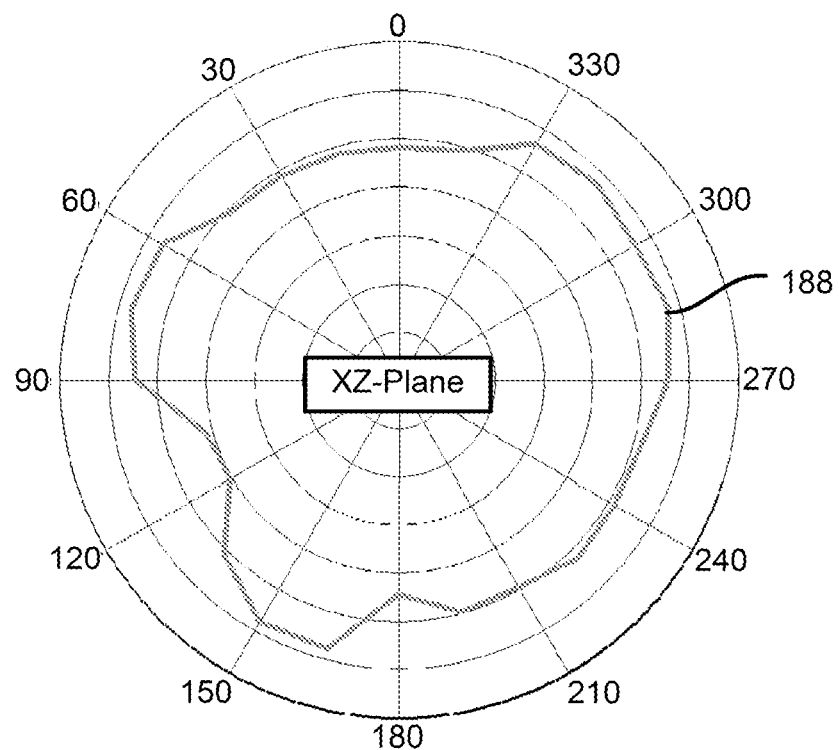
FIGS. 9A and 9B are radiation patterns of an antenna shown in FIG. 7.
Figure 9B:
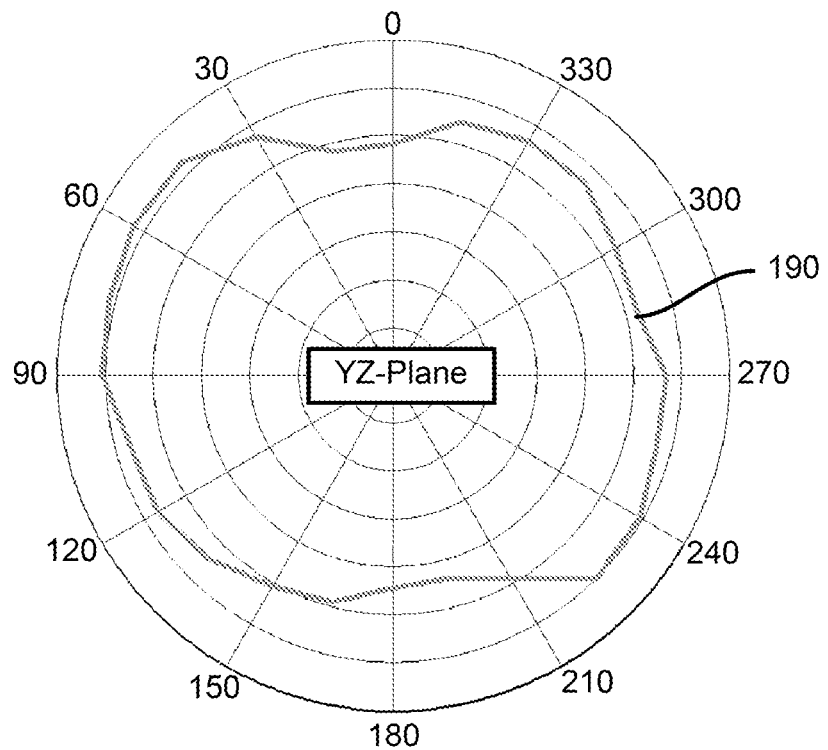

FIG. 9A is a radiation pattern 188 of the antenna 152B in the XY-Plane, based on measurements taken during a set of experiments while the antenna 152B transmits signals having a center frequency of 1755 MHz. FIG. 9B is a radiation pattern 190 of the antenna 152B in the YZ-Plane, based on measurements taken during a set of experiments while the antenna 152B transmits signals having a center frequency of 1755 MHz.

Figure 10A:
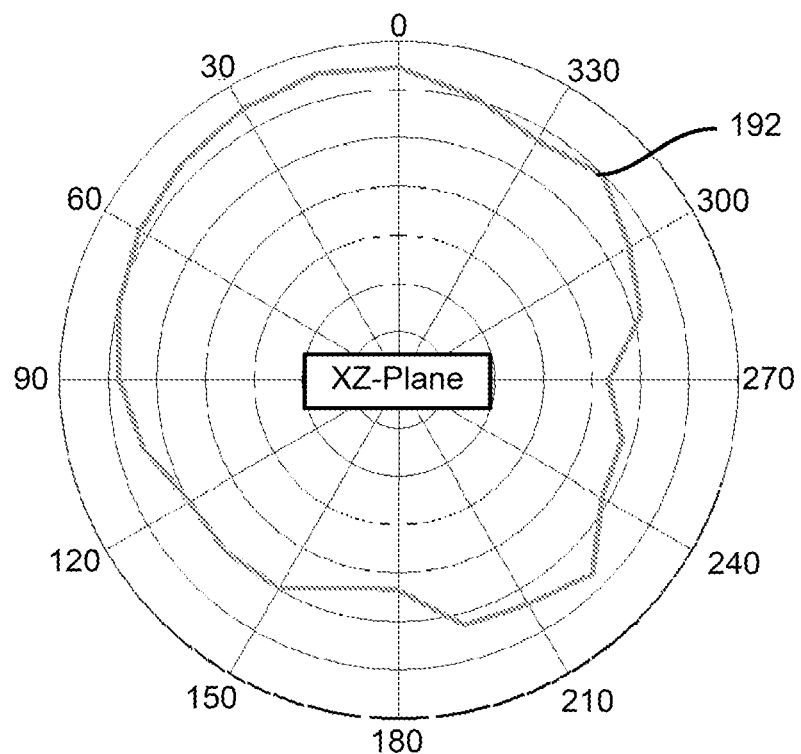
FIGS. 10A and 10B are radiation patterns of an antenna shown in FIG. 7.
Figure 10B:
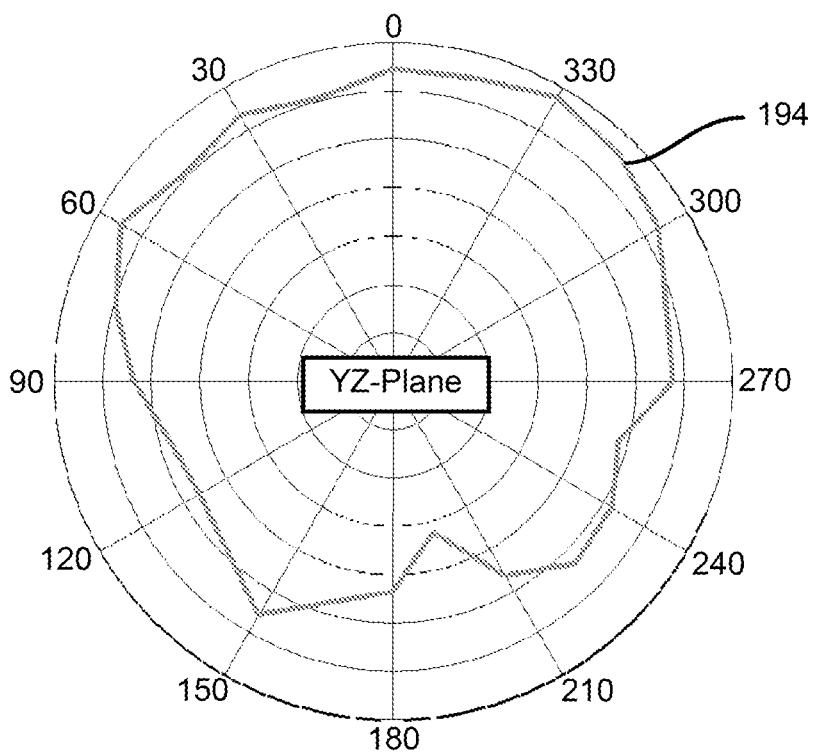

FIG. 10A is a radiation pattern 192 of the antenna 152A in the XY-Plane, based on measurements taken during a set of experiments while the antenna 152A transmits signals having a center frequency of 1755 MHz. FIG. 10B is a radiation pattern 194 of the antenna 152A in the YZ-P lane, based on measurements taken during a set of experiments while the antenna 152A transmits signals having a center frequency of 1755 MHz.

Figure 11A:
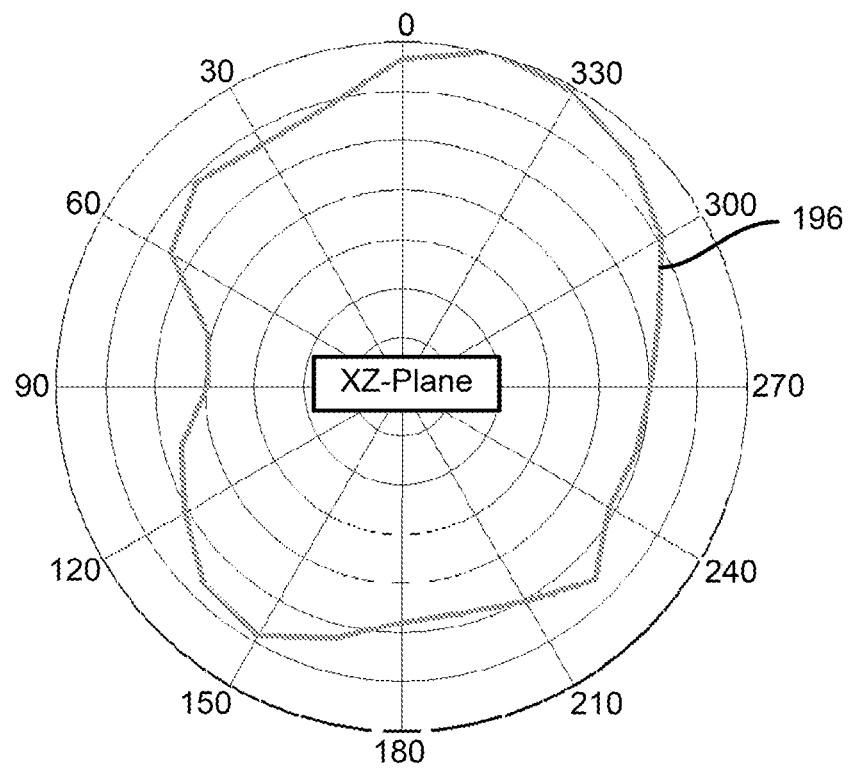
FIGS. 11A and 11B are radiation patterns of an antenna shown in FIG. 7.
Figure 11B:
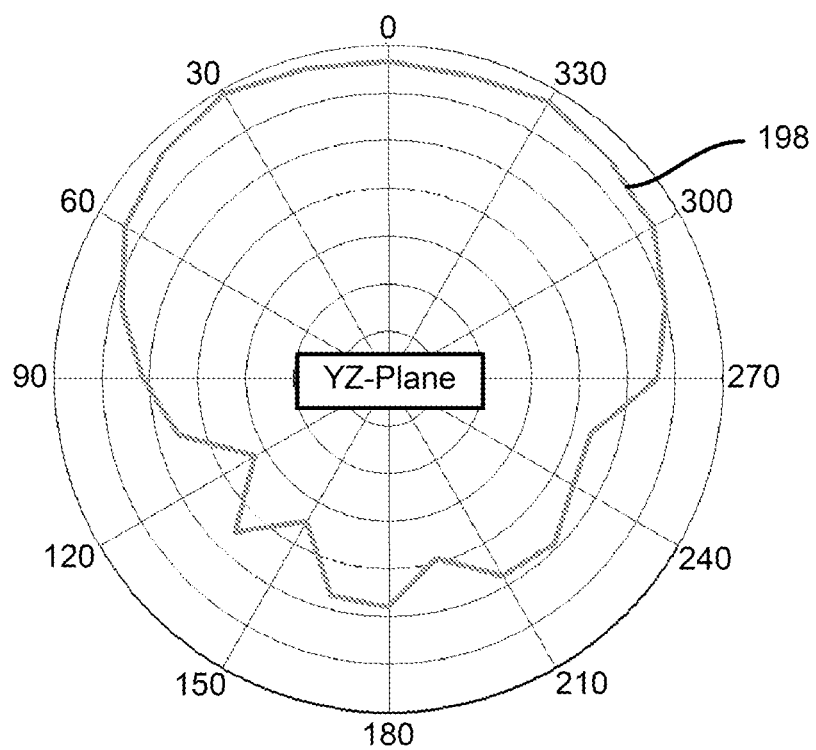

FIG. 11A is a radiation pattern 196 of the antenna 152B in the XY-Plane, based on measurements taken during a set of experiments while the antenna 152B transmits signals having a center frequency of 1755 MHz. FIG. 11B is a radiation pattern 198 of the antenna 152B in the YZ-Plane, based on measurements taken during a set of experiments while the antenna 152B transmits signals having a center frequency of 1755 MHz.

TABLE 1

Peak Gain and Efficiency for Antenna 152A (Metal PIFA)

| Frequency (MHz) | Efficiency (%) | Peak Gain (dBi) |
|---|---|---|
| 1710 | 55.1 | 1.24 |
| 1732 | 57.0 | 1.27 |
| 1755 | 61.0 | 1.86 |
| 2110 | 61.1 | 2.98 |
| 2132 | 57.7 | 2.63 |
| 2155 | 53.9 | 1.98 |

TABLE 2

Peak Gain and Efficiency for Antenna 152A (FPC PIFA)

| Frequency (MHz) | Efficiency (%) | Peak Gain (dBi) |
|---|---|---|
| 1710 | 60.8 | 4.14 |
| 1732 | 63.7 | 4.35 |
| 1755 | 62.3 | 4.48 |
| 2110 | 61.2 | 4.81 |
| 2132 | 62.7 | 4.44 |
| 2155 | 58.1 | 4.12 |

TABLE 3

Peak Gain and Efficiency for Antenna 152B (Metal PIFA)

| Frequency (MHz) | Efficiency (%) | Peak Gain (dBi) |
|---|---|---|
| 1710 | 58.8 | 2.16 |
| 1732 | 59.8 | 1.87 |
| 1755 | 61.3 | 2.04 |
| 2110 | 56.3 | 2.99 |
| 2132 | 53.7 | 3.10 |
| 2155 | 52.6 | 2.85 |

TABLE 4

Peak Gain and Efficiency for Antenna 152B (FPC PIFA)

| Frequency (MHz) | Efficiency (%) | Peak Gain (dBi) |
|---|---|---|
| 1710 | 65.2 | 5.11 |
| 1732 | 71.9 | 5.84 |
| 1755 | 69.2 | 5.73 |
| 2110 | 63.9 | 5.92 |
| 2132 | 64.0 | 5.61 |
| 2155 | 58.6 | 4.65 |

Acceptable cellular coverage, including cellular coverage directly below the light fixture on which the small cell networking device 100 is mounted, may be provided when both types of antennas (i.e., metal PIFA and FPC PIFA) are used for the antenna 152A and the antenna 1528. However, performance may be improved in some respects when a FPC PIFA type of antenna is used for the antenna 152A and the antenna 1528. For example, as shown in Tables 1-4 above, increased efficiency and peak gain resulted from use of the FPC PIFA type of antenna for the antenna 152A and the antenna 152B.

Figure 12:
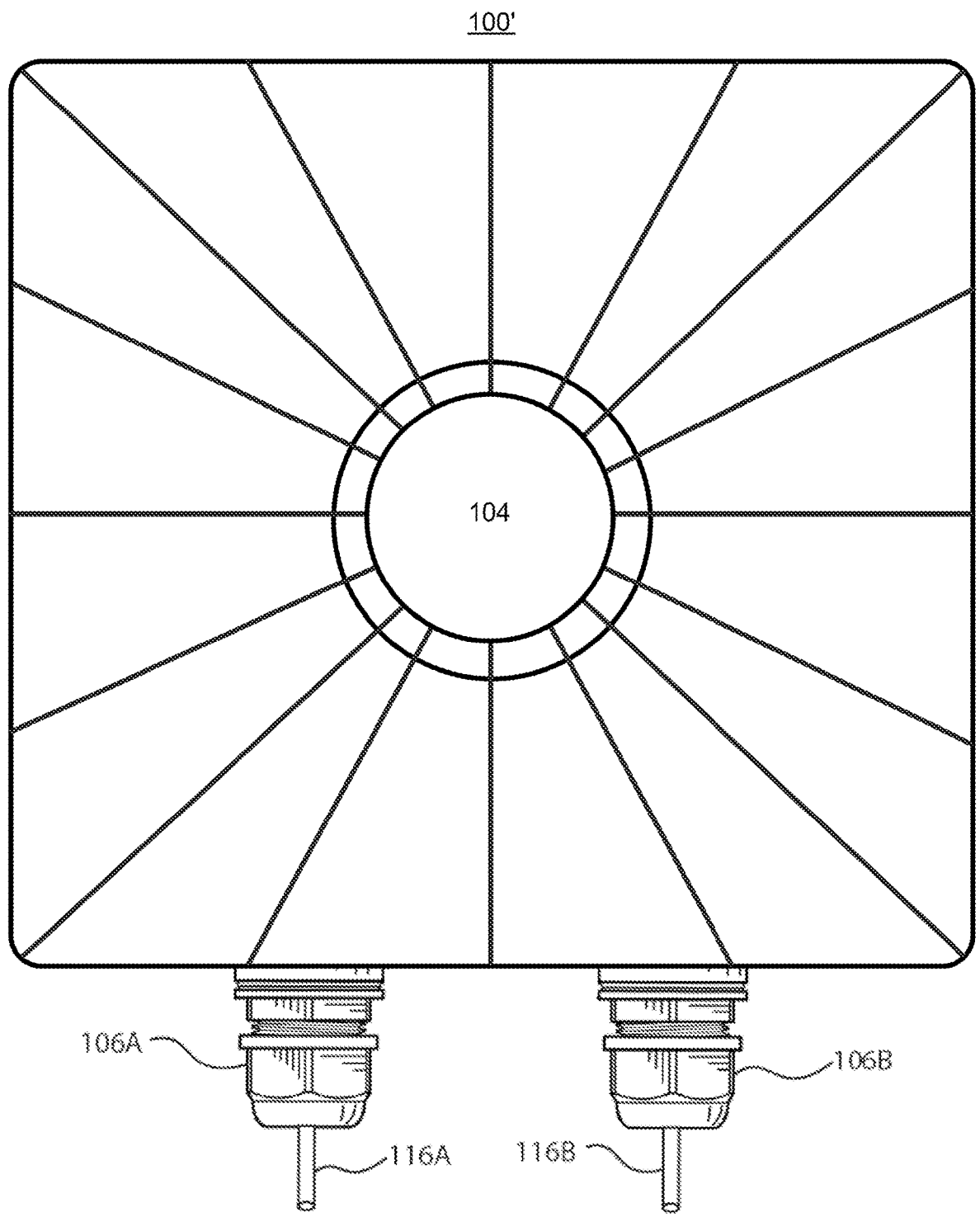
FIG. 12 is a top view of a small cell networking device according to one or more embodiments of the present disclosure.
Figure 13:
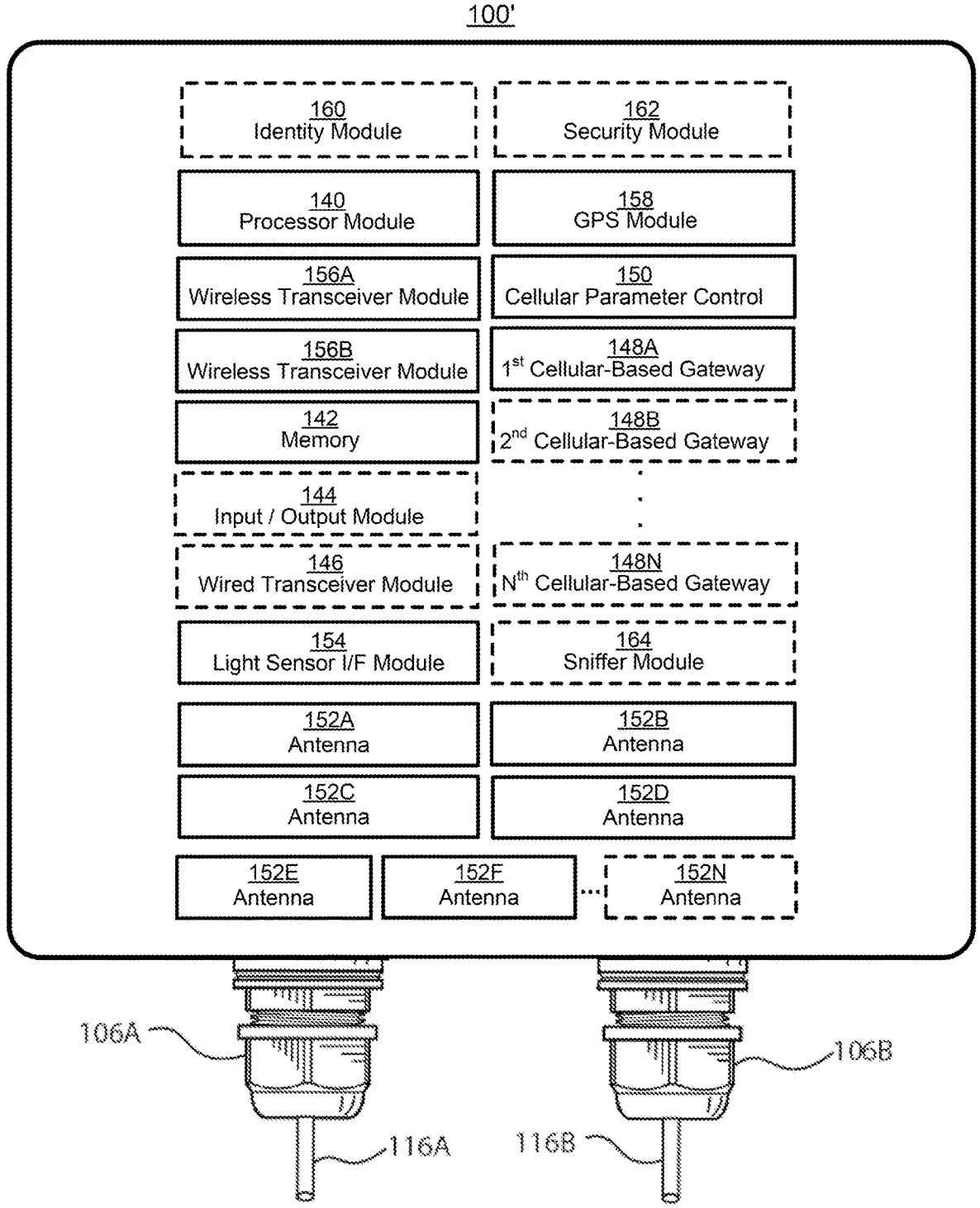
FIG. 13 is a block diagram of the small cell networking device shown in FIG. 12.

FIG. 12 is a top view of a small cell networking device 100' according to one or more embodiments of the present disclosure. The small cell networking device 100' is similar in many relevant respects to the small cell networking device 100 shown in FIGS. 3A, 3B, 3C, and 4, except that the small cell networking device 100' has a substantially rectangular form factor wherein a horizontal cross section has a substantially rectangular (e.g., square) shape and the antenna configuration is different. FIG. 13 is a block diagram of the small cell networking device shown 100'. The small cell networking device 100' may include the same, or different, components as included the small cell networking device shown 100, which are described above in connection with FIG. 4, for example.

Figure 14:
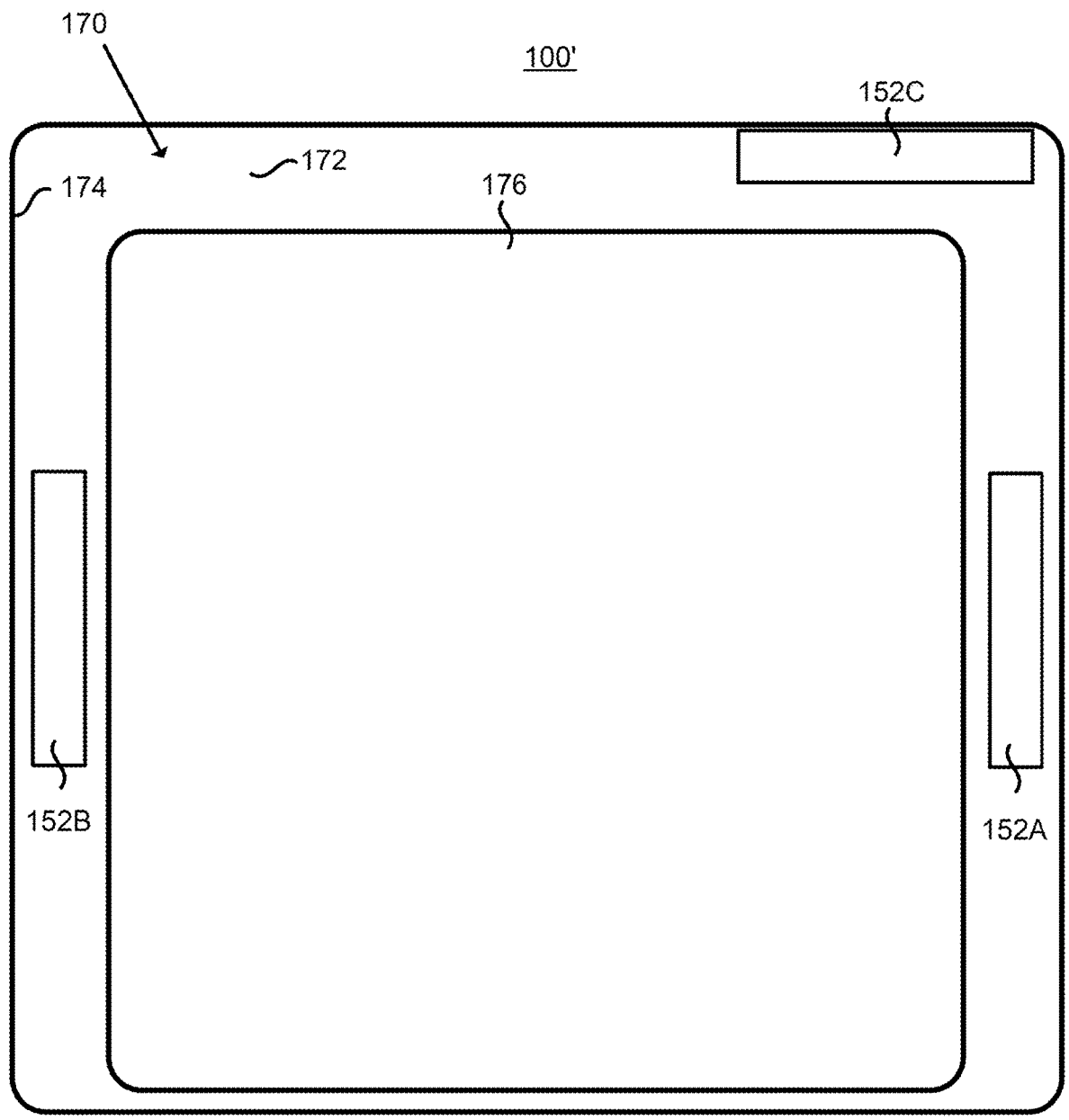
FIG. 14 is a physical layout of some of the components of the small cell networking device embodiment shown in FIG. 13.

FIG. 14 is a physical layout of some of the components of the small cell networking device 100' shown in FIG. 12. More particularly, FIG. 14 shows an antenna 152A, an antenna 152B, an antenna 152C, and a printed circuit board 176 mounted in an internal compartment 170 of the small cell networking device 100'. The internal compartment 170 is defined by a lower surface 172 and a side surface 174 that extends upwardly from the lower surface 172 along the periphery of the lower surface 172. In one or more embodiments, the printed circuit board 176 includes the same, or similar components, as described above in connection with the printed circuit board 176 shown in FIG. 7.

In one or more embodiments, the antenna 152A is an LTE Band 4 antenna. For example, the antenna 152A is a Planar Inverted-F Antenna (PIFA) formed from a Flexible Printed Circuit (FPC), and has dimensions of 56(L)×50(W)×0.25(T) mm$^3$. In one or more embodiments, the antenna 152A is mounted to the lower surface 172 of the compartment 170 (e.g., using an adhesive tape) between the printed circuit board 176 and the side surface 174 of the compartment 170 such that the antenna 152A is parallel to the lower surface 172 of the compartment 170.

In one or more embodiments, the antenna 152B is an LTE Band 4 antenna. For example, the antenna 152B is a PIFA formed from a FPC, and has dimensions of 77.5(L)×54(W)×0.65(T) mm$^3$. In one or more embodiments, the antenna 152B is mounted to the lower surface 172 of the compartment 170 (e.g., using an adhesive tape) between the printed circuit board 176 and the side surface 174 of the compartment 170 such that the antenna 152B is parallel to the lower surface 172 of the compartment 170.

In one or more embodiments, the antenna 152C is an LTE Band 2/Band 4 antenna. For example, the antenna 152C is a dipole antenna formed from a FPC, and has dimensions of 50(L)×35(W)×0.25(T) mm$^3$. In one or more embodiments, the antenna 152C is used to monitor or "sniff" network traffic. In one or more embodiments, the antenna 152C is mounted to the side surface 174 of the compartment 170 (e.g., using an adhesive tape) between the printed circuit board 176 and the side surface 174 of the compartment 170.

The inventors of the present disclosure performed testing and experimentation in which signals were transmitted from each of the antenna 152A, the antenna 152B, and the antenna 152C at a variety of frequencies, including 1710 MHz, 1755 MHz, 2110 MHz, and 2155 MHz. Measurements were taken at each of a plurality of locations around the small cell networking device 100', at orientations ranging from zero degrees to three-hundred-sixty degrees in each of at least an XZ-plane and a YZ-Plane (see FIG. 3B for indicators of the X, Y, and Z directions). The return loss of each antenna and the degree of isolation of both antennas were also calculated. Various radiation patterns of each antenna were measured and plotted. In addition, the efficiency and peak gain were calculated, as shown in Tables 5-7 below.

Figure 15A:
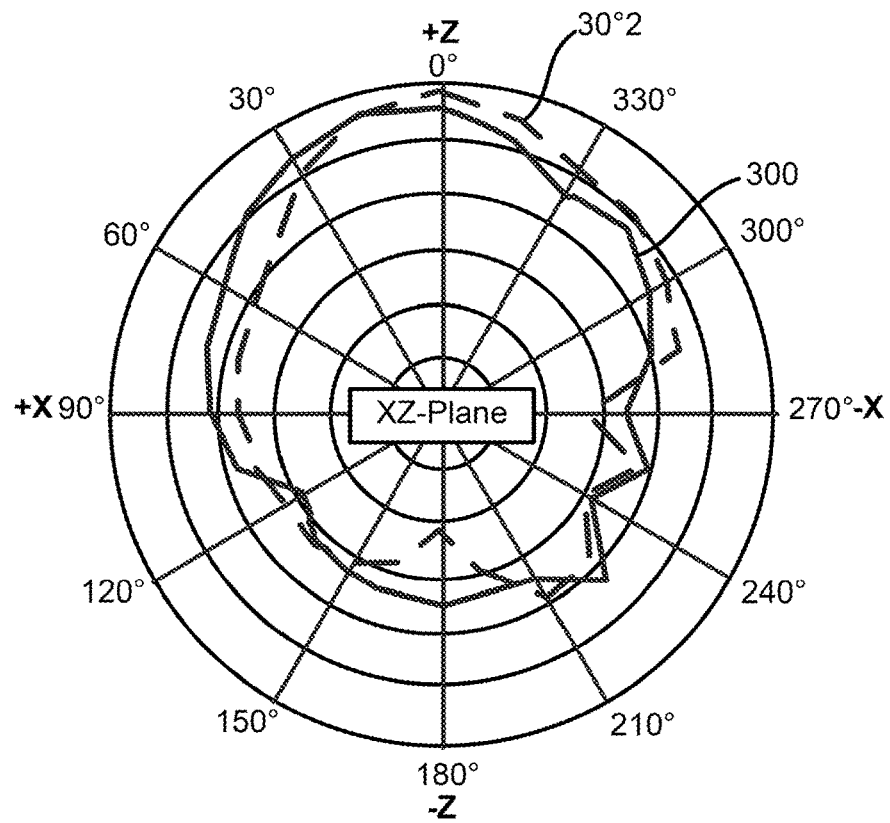
FIGS. 15A and 15B are radiation patterns of an antenna shown in FIG. 14.
Figure 15B:
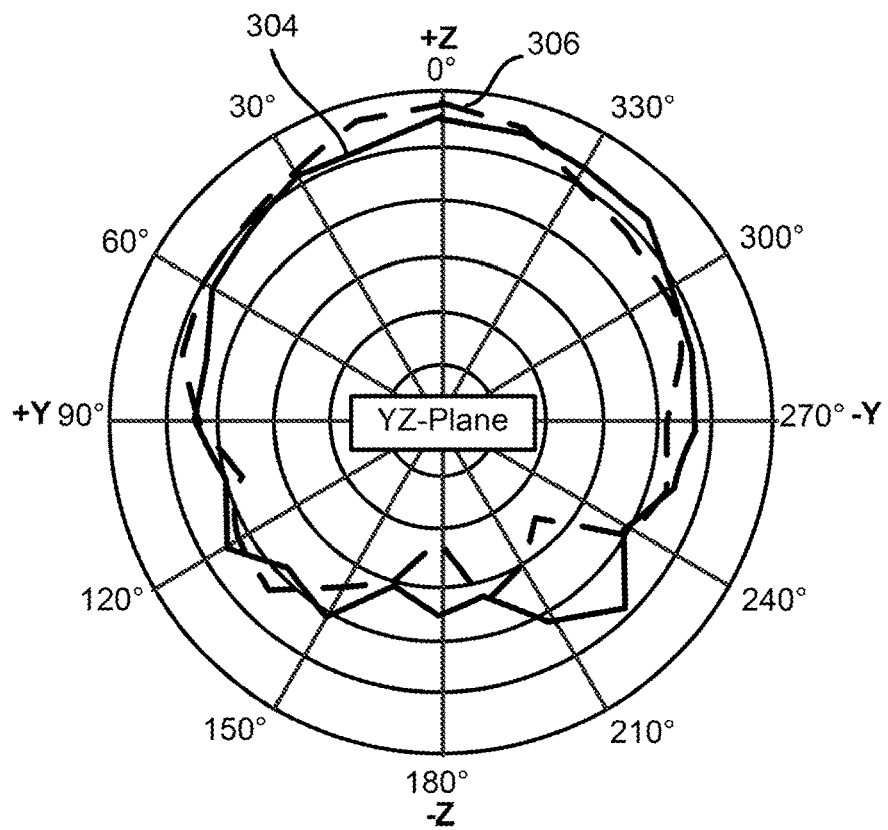

FIG. 15A shows radiation patterns 300 and 302 of the antenna 152A in the XY-Plane. The radiation pattern 300 is based on measurements taken during a set of experiments while the antenna 152A transmitted signals having a center frequency of 1710 MHz. The radiation pattern 302 is based on measurements taken during a set of experiments while the antenna 152A transmitted signals having a center frequency of 2110 MHz. FIG. 15B shows radiation patterns 304 and 306 of the antenna 152A in the YZ-Plane. The radiation pattern 304 is based on measurements taken during a set of experiments while the antenna 152A transmitted signals having a center frequency of 1710 MHz. The radiation pattern 306 is based on measurements taken during a set of experiments while the antenna 152A transmitted signals having a center frequency of 2110 MHz.

Figure 16A:
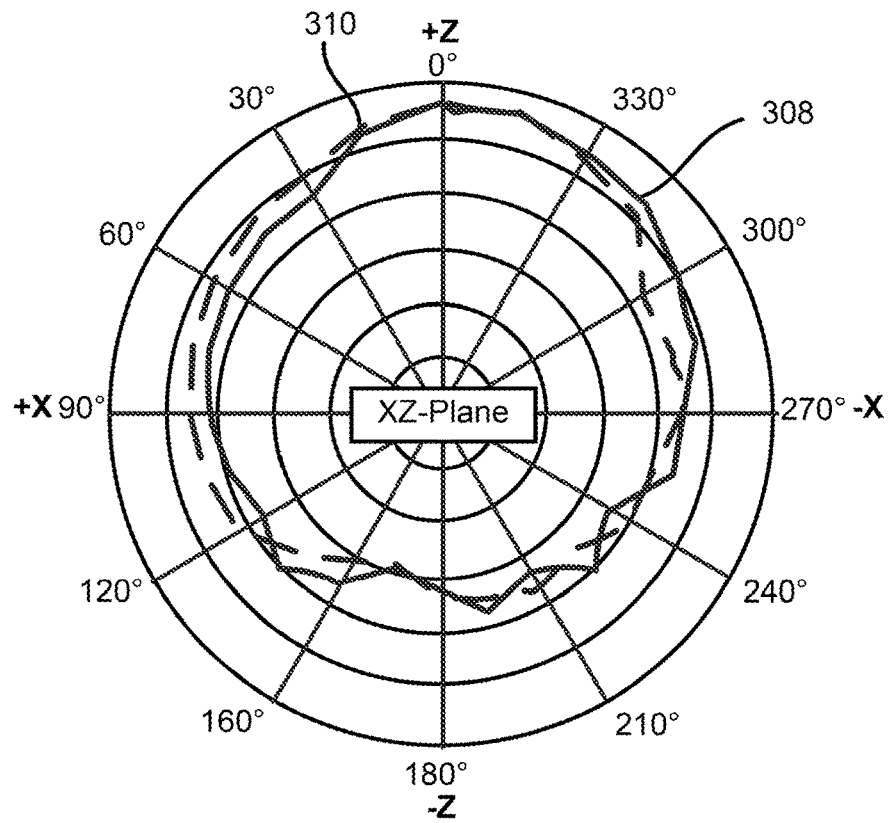
FIGS. 16A and 16B are radiation patterns of an antenna shown in FIG. 14.
Figure 16B:
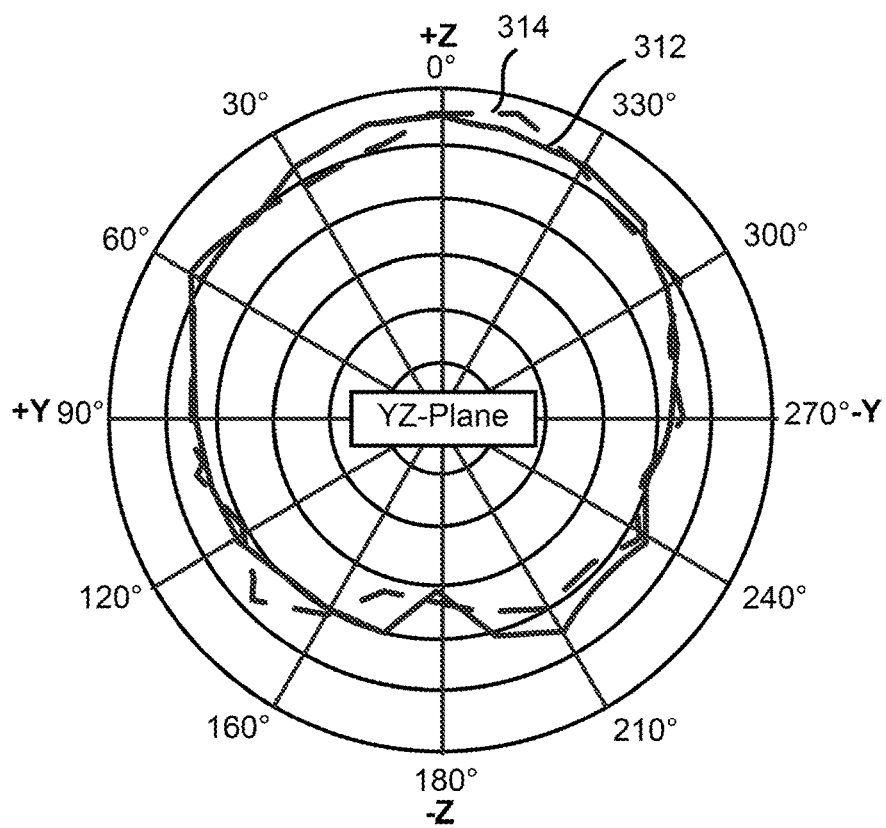

FIG. 16A shows radiation patterns 308 and 310 of the antenna 152B in the XY-Plane. The radiation pattern 308 is based on measurements taken during a set of experiments while the antenna 152B transmitted signals having a center frequency of 1710 MHz. The radiation pattern 310 is based on measurements taken during a set of experiments while the antenna 152B transmitted signals having a center frequency of 2110 MHz. FIG. 16B shows radiation patterns 312 and 314 of the antenna 152B in the YZ-Plane. The radiation pattern 312 is based on measurements taken during a set of experiments while the antenna 152B transmitted signals having a center frequency of 1710 MHz. The radiation pattern 306 is based on measurements taken during a set of experiments while the antenna 152B transmitted signals having a center frequency of 2110 MHz.

Figure 17A:
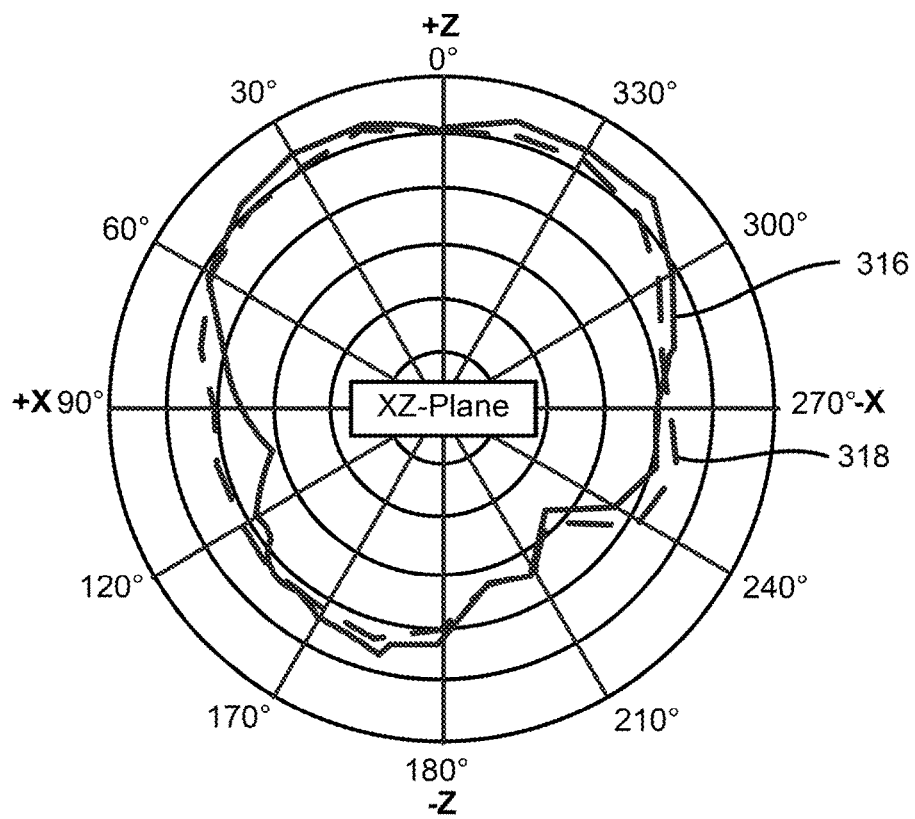
FIGS. 17A and 17B are radiation patterns of an antenna shown in FIG. 14.
Figure 17B:
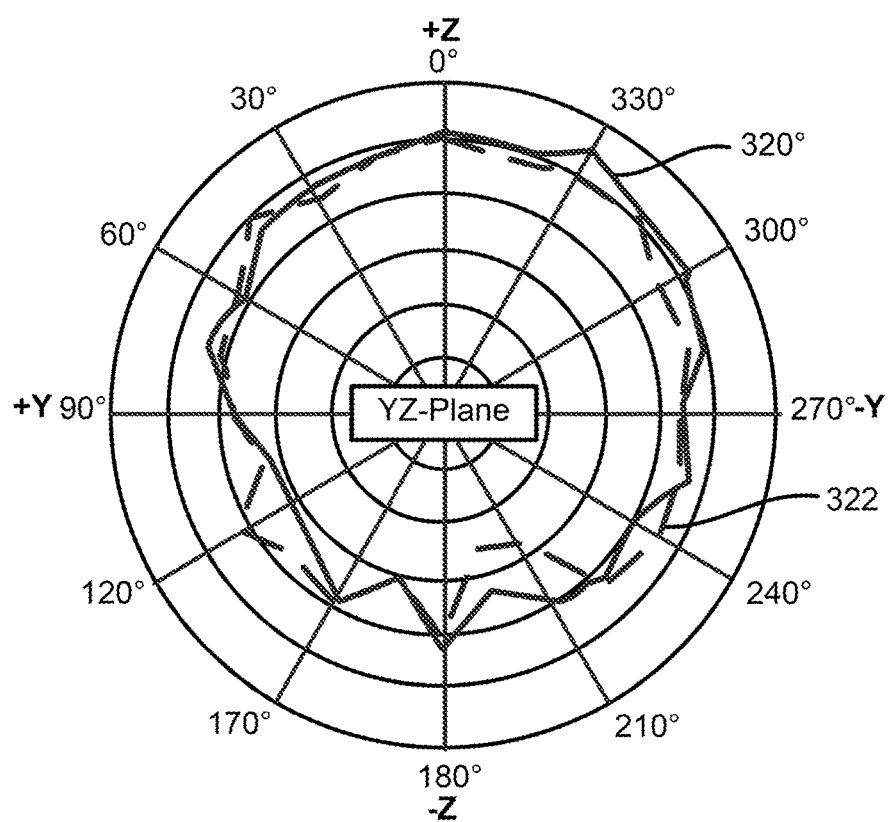

FIG. 17A shows radiation patterns 316 and 318 of the antenna 152C in the XY-Plane. The radiation pattern 316 is based on measurements taken during a set of experiments while the antenna 152C transmitted signals having a center frequency of 1930 MHz. The radiation pattern 318 is based on measurements taken during a set of experiments while the antenna 152C transmitted signals having a center frequency of 2155 MHz. FIG. 17B shows radiation patterns 320 and 322 of the antenna 152C in the YZ-Plane. The radiation pattern 320 is based on measurements taken during a set of experiments while the antenna 152C transmitted signals having a center frequency of 1930 MHz. The radiation pattern 322 is based on measurements taken during a set of experiments while the antenna 152C transmitted signals having a center frequency of 2155 MHz.

TABLE 5

Peak Gain and Efficiency for Antenna 152A

| Frequency (MHz) | Efficiency (%) | Peak Gain (dBi) |
|---|---|---|
| 1710 | 60.6 | 6.02 |
| 1755 | 63.5 | 5.90 |
| 2110 | 60.7 | 6.86 |
| 2155 | 56.3 | 6.49 |

TABLE 6

Peak Gain and Efficiency for Antenna 152B

| Frequency (MHz) | Efficiency (%) | Peak Gain (dBi) |
|---|---|---|
| 1710 | 62.6 | 6.05 |
| 1755 | 60.5 | 5.44 |
| 2110 | 58.6 | 6.30 |
| 2155 | 55.2 | 5.75 |

TABLE 7

Peak Gain and Efficiency for Antenna 152C

| Frequency (MHz) | Efficiency (%) | Peak Gain (dBi) |
|---|---|---|
| 1710 | 60.2 | 4.12 |
| 1755 | 52.7 | 3.62 |
| 2110 | 53.7 | 2.41 |
| 2155 | 51.4 | 2.23 |

Acceptable cellular coverage, including cellular coverage directly below the light fixture on which the small cell networking device 100' is mounted, may be provided by the small cell networking device 100'. The small cell networking device 100' may have improved performance compared to the small cell networking device 100. As can be seen by comparing Tables 1 and 2 to Table 5, for example, the antenna 152A of the small cell networking device 100' has a greater peak gain than the antenna 152A of the small cell networking device 100 for all of the frequencies. Additionally, as can be seen by comparing Tables 3 and 4 to Table 6, for example, the antenna 1526 of the small cell networking device 100' has a greater peak gain than the antenna 1526 of the small cell networking device 100.

As used in the present disclosure, the term "module" refers to an application specific integrated circuit (ASIC), an electronic circuit, a processor and a memory operative to execute one or more software or firmware programs, combinational logic circuitry, or other suitable components (hardware, software, or hardware and software) that provide the functionality described with respect to the module.

The terms, "real-time" or "real time," as used herein and in the claims that follow, are not intended to imply instantaneous processing, transmission, reception, or otherwise as the case may be. Instead, the terms, "real-time" and "real time" imply that the activity occurs over an acceptably short period of time (e.g., over a period of microseconds or milliseconds), and that the activity may be performed on an ongoing basis (e.g., recording and reporting the collection of utility grade power metering data, recording and reporting IoT data, crowd control data, anomalous action data, and the like). An example of an activity that is not real-time is one that occurs over an extended period of time (e.g., hours or days) or that occurs based on intervention or direction by a person or other activity.

In the absence of any specific clarification related to its express use in a particular context, where the terms "substantial" or "about" in any grammatical form are used as modifiers in the present disclosure and any appended claims (e.g., to modify a structure, a dimension, a measurement, or some other characteristic), it is understood that the characteristic may vary by up to 30 percent. For example, a small cell networking device may be described as being mounted "substantially horizontal," In these cases, a device that is mounted exactly horizontal is mounted along an "X" axis and a "Y" axis that is normal (i.e., 90 degrees or at right angle) to a plane or line formed by a "Z" axis. Different from the exact precision of the term, "horizontal," and the use of "substantially" or "about" to modify the characteristic permits a variance of the particular characteristic by up to 30 percent. As another example, a small cell networking device having a particular linear dimension of between about six (6) inches and twelve (12) inches includes such devices in which the linear dimension varies by up to 30 percent. Accordingly, the particular linear dimension of the small cell networking device may be between 2.4 inches and 15.6 inches.

The terms "include" and "comprise" as well as derivatives thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Unless the context requires otherwise, throughout the specification and claims which follow, the word "comprise" and variations thereof, such as, "comprises" and "comprising," are to be construed in an open, inclusive sense, e.g., "including, but not limited to."

Reference throughout this specification to "one embodiment" or "an embodiment" or "one or more embodiments" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

As described herein, for simplicity, a user is in some case described in the context of the male gender. For example, the terms "his," "him," and the like may be used. It is understood that a user can be of any gender, and the terms "he," "his," and the like as used herein are to be interpreted broadly inclusive of all known gender definitions.

As the context may require in this disclosure, except as the context may dictate otherwise, the singular shall mean the plural and vice versa; all pronouns shall mean and include the person, entity, firm or corporation to which they relate; and the masculine shall mean the feminine and vice versa.

When so arranged as described herein, each computing device may be transformed from a generic and unspecific computing device to a combination device comprising hardware and software configured for a specific and particular purpose. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The headings and Abstract of the Disclosure provided herein are for convenience only and do not limit or interpret the scope or meaning of the embodiments.

The various embodiments described above can be combined to provide further embodiments. In addition, all of the U.S. patents, U.S. patent application publications, U.S. patent applications, foreign patents, foreign patent applications and non-patent publications referred to in this specification and/or listed in the Application Data Sheet, if any, including U.S. patent application Ser. No. 62/614,918, filed Jan. 8, 2018, and U.S. patent application Ser. No. 62/730,486, filed Sep. 12, 2018, are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A small cell networking device, comprising:
a light sensor;
a processor-based light control circuit arranged to provide a light control signal based on at least one ambient light signal generated by the light sensor;
a compartment defined by a first surface and a second surface that extends from the first surface along the periphery of the first surface;
at least one printed circuit board mounted in the compartment;
a first networking module mounted on the at least one printed circuit board, the first networking module being arranged as a gateway to a first cellular-based network, the first cellular-based network controlled by a first mobile network operator (MNO);
a second networking module mounted on the at least one printed circuit board, the second networking module being arranged as a gateway to a second cellular-based network, the second cellular-based network controlled by a second MNO;
a third networking module mounted on the at least one printed circuit board, the third networking module being arranged to monitor traffic in the first cellular-based network or the second cellular-based network;
a first antenna mounted to the first surface between the second surface and the at least one printed circuit board, the first antenna being communicatively coupled to the first wireless transceiver module;
a second antenna mounted to the first surface between the second surface and the at least one printed circuit board, the second antenna being communicatively coupled to the second wireless transceiver module; and
a third antenna mounted to the second surface between the second surface and the at least one printed circuit board, the third antenna being communicatively coupled to the third networking module.

2. The small cell networking device of claim 1, wherein the first antenna is disposed at a first side of the compartment, the second antenna is disposed at a second side of the compartment, and the first side of the compartment is opposite the second side of the compartment.

3. The small cell networking device of claim 1, wherein the first surface is a planar surface having a rectangular shape.

4. The small cell networking device of claim 1, comprising:
a connector compliant with a roadway area lighting standard promoted by a standards body.

5. The small cell networking device of claim 4, wherein the connector is compliant with American National Standards Institute (ANSI) C136.

6. The small cell networking device of claim 1, comprising:
a location module mounted on the at least one printed circuit board, the location module being arranged to provide data suitable to determine a location of the small cell networking device.

7. A small cell networking device, comprising:
a light sensor;
a processor-based light control circuit arranged to provide a light control signal based on at least one ambient light signal generated by the light sensor;
a compartment defined by a first surface and a second surface that extends from the first surface along the periphery of the first surface;
at least one printed circuit board mounted in the compartment;
a first wireless transceiver module mounted on the at least one printed circuit board, the first wireless transceiver module being arranged to transmit and receive data according to a first data communication standard;
a second wireless transceiver module mounted on the at least one printed circuit board, the second wireless transceiver module being arranged to transmit and receive data according to a second data communication standard, the second data communication standard being different from the first data communication standard;
a location module mounted on the at least one printed circuit board, the location module being arranged to provide data suitable to determine a location of the small cell networking device;
a first networking module mounted on the at least one printed circuit board, the first networking module being arranged as a gateway to a first cellular-based network, the first cellular-based network controlled by a first mobile network operator (MNO);
a first antenna mounted to the first surface between the second surface and the at least one printed circuit board, the first antenna being communicatively coupled to the first wireless transceiver module;
a second antenna mounted to the first surface between the second surface and the at least one printed circuit board, the second antenna being communicatively coupled to the second wireless transceiver module;
a third antenna mounted to the first surface between the second surface and the at least one printed circuit board, the third antenna being communicatively coupled to the location module; and
a fourth antenna mounted to the first surface between the second surface and the at least one printed circuit board, the fourth antenna being communicatively coupled to the first networking module.

8. The small cell networking device of claim 7, comprising:
a second networking module mounted on the at least one printed circuit board, the second networking module being arranged as a gateway to a second cellular-based network, the second cellular-based network controlled by a second mobile network operator (MNO); and
a fifth antenna mounted to the first surface between the second surface and the at least one printed circuit board, the fifth antenna being communicatively coupled to the second networking module.

9. The small cell networking device of claim 8, wherein the fourth antenna is disposed at a first side of the compartment, the fifth antenna is disposed at a second side of the compartment, and the first side of the compartment is opposite the second side of the compartment.

10. The small cell networking device of claim 8, comprising:
a first shield structure mounted on the at least one printed circuit board, the first shield structure being at least partially disposed between the fourth antenna and the fifth antenna.

11. The small cell networking device of claim 8, comprising:
a third networking module mounted on the at least one printed circuit board, the third networking module being arranged to at least receive signals transmitted on the first cellular-based network or the second cellular-based network; and
a sixth antenna mounted to the first surface between the second surface and the at least one printed circuit board, the sixth antenna being communicatively coupled to the third networking module.

12. The small cell networking device of claim 7, comprising:
a connector compliant with a roadway area lighting standard promoted by a standards body.

13. The small cell networking device of claim 12, wherein the connector is compliant with American National Standards Institute (ANSI) C136.

14. A small cell networking device, comprising:
a light sensor;
a processor-based light control circuit arranged to provide a light control signal based on at least one ambient light signal generated by the light sensor;
a compartment defined by a first surface and a second surface that extends from the first surface along the periphery of the first surface;
at least one printed circuit board mounted in the compartment;
a first networking module mounted on the at least one printed circuit board, the first networking module being arranged as a gateway to a first cellular-based network, the first cellular-based network controlled by a first mobile network operator (MNO);
a second networking module mounted on the at least one printed circuit board, the second networking module being arranged as a gateway to a second cellular-based network, the second cellular-based network controlled by a second mobile network operator (MNO);

a first wireless transceiver module mounted on the at least one printed circuit board, the first wireless transceiver module being arranged to transmit and receive data according to a first data communication standard;

a second wireless transceiver module mounted on the at least one printed circuit board, the second wireless transceiver module being arranged to transmit and receive data according to a second data communication standard, the second data communication standard being different from the first data communication standard;

a first antenna mounted to the first surface between the second surface and the at least one printed circuit board, the first antenna being communicatively coupled to the first networking module;

a second antenna mounted to the first surface between the second surface and the at least one printed circuit board, the second antenna being communicatively coupled to the second networking module;

a third antenna mounted to the first surface between the second surface and the at least one printed circuit board, the third antenna being communicatively coupled to the first wireless transceiver module; and a fourth antenna mounted to the first surface between the second surface and the at least one printed circuit board, the fourth antenna being communicatively coupled to the second wireless transceiver module.

15. The small cell networking device of claim 14 wherein the first antenna is disposed at a first side of the compartment, the second antenna is disposed at a second side of the compartment, and the first side of the compartment is opposite the second side of the compartment.

16. The small cell networking device of claim 14, comprising:
a first shield structure mounted on the at least one printed circuit board, the first shield structure being at least partially disposed between the first antenna and the second antenna.

17. The small cell networking device of claim 14, wherein the first surface is a planar surface having a circular shape, and the second surface provides a wall of a substantially cylindrical body.

18. The small cell networking device of claim 14, comprising:
a third networking module mounted on the at least one printed circuit board, the third networking module being arranged to at least receive signals transmitted on the first cellular-based network or the second cellular-based network; and
a fifth antenna mounted to the first surface between the second surface and the at least one printed circuit board, the fifth antenna being communicatively coupled to the third networking module.

19. The small cell networking device of claim 18, comprising:
a location module mounted on the at least one printed circuit board, the location module being arranged to provide data suitable to determine a location of the small cell networking device; and
a sixth antenna mounted to the first surface between the second surface and the at least one printed circuit board, the sixth antenna being communicatively coupled to the location module.

20. The small cell networking device of claim 14, comprising:
a connector compliant with a roadway area lighting standard promoted by a standards body.

* * * * *